United States Patent
Fujisawa

(10) Patent No.: US 6,429,624 B2
(45) Date of Patent: *Aug. 6, 2002

(54) OVERCHARGE PREVENTION METHOD, CHARGING CIRCUIT, ELECTRONIC EQUIPMENT AND TIMEPIECE FOR PREVENTING OVERCHARGE OF A CHARGE STORAGE DEVICE

(75) Inventor: Teruhiko Fujisawa, Shiojiri (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,785

(22) PCT Filed: Mar. 19, 1999

(86) PCT No.: PCT/JP99/01383

§ 371 (c)(1), (2), (4) Date: Jan. 5, 2000

(87) PCT Pub. No.: WO99/48184

PCT Pub. Date: Sep. 23, 1999

(30) Foreign Application Priority Data

Mar. 19, 1998 (JP) .............................................. 10-70301

(51) Int. Cl.[7] .............................................. H01M 10/46
(52) U.S. Cl. ........................................ 320/134; 320/136
(58) Field of Search ................................. 320/118, 119, 320/120, 136, 134; 363/134

(56) References Cited

U.S. PATENT DOCUMENTS 4,365,241 A * 12/1982 Morishita ................... 340/636
4,574,275 A * 3/1986 Morishita et al. ........... 340/636
5,783,928 A * 7/1998 Okamura ..................... 320/122
6,008,627 A * 12/1999 Narita ......................... 320/134

FOREIGN PATENT DOCUMENTS

| JP | 63-137541 | 9/1988 |
| JP | 2652057 | 5/1997 |

* cited by examiner

Primary Examiner—Adolf Deneke Berhane

(57) ABSTRACT

A charging circuit for rectifying an alternating-current voltage and for charging an electrical charge into a charging element includes first and second switching units, in which, according to a terminal voltage at one of respective input terminals to which an AC voltage is supplied, it is controlled whether or not the other one of the input terminals and a first power supply line are connected; first and second diodes which are connected between the respective input terminals and a second power supply line; and a charging element connected between the first and second power supply lines, and it is configured to detect a charging voltage of the charging element, compare the detected charging voltage with a reference voltage that is defined in advance, and supply a generator current that flows into one of the input terminals to the other one of the input terminals through a path that does not pass through the first and second diodes when the charging voltage exceeds the reference voltage, so that a circuit can be configured without requiring the use a plurality of comparators, and thus the circuit scale can be made small, and also a low power consumption can be reduced.

46 Claims, 16 Drawing Sheets

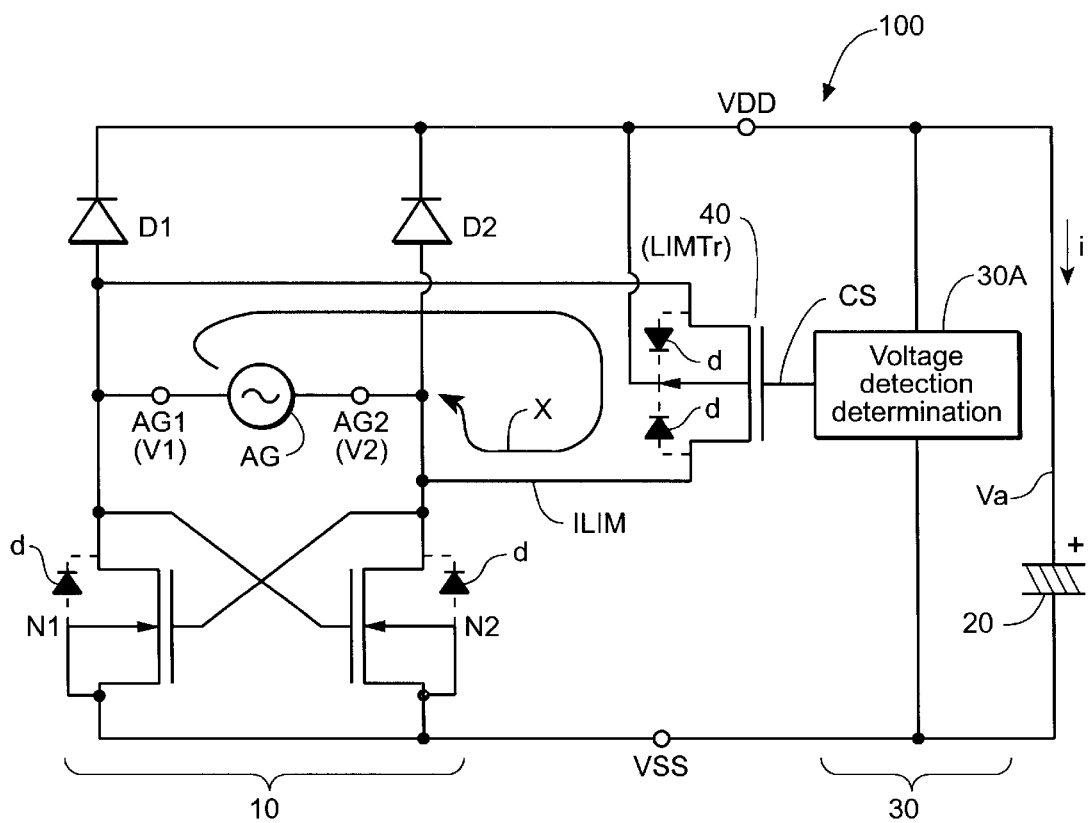
FIG._1
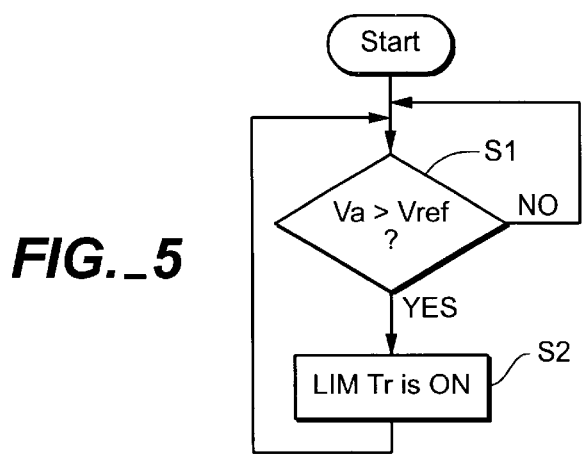
FIG._5

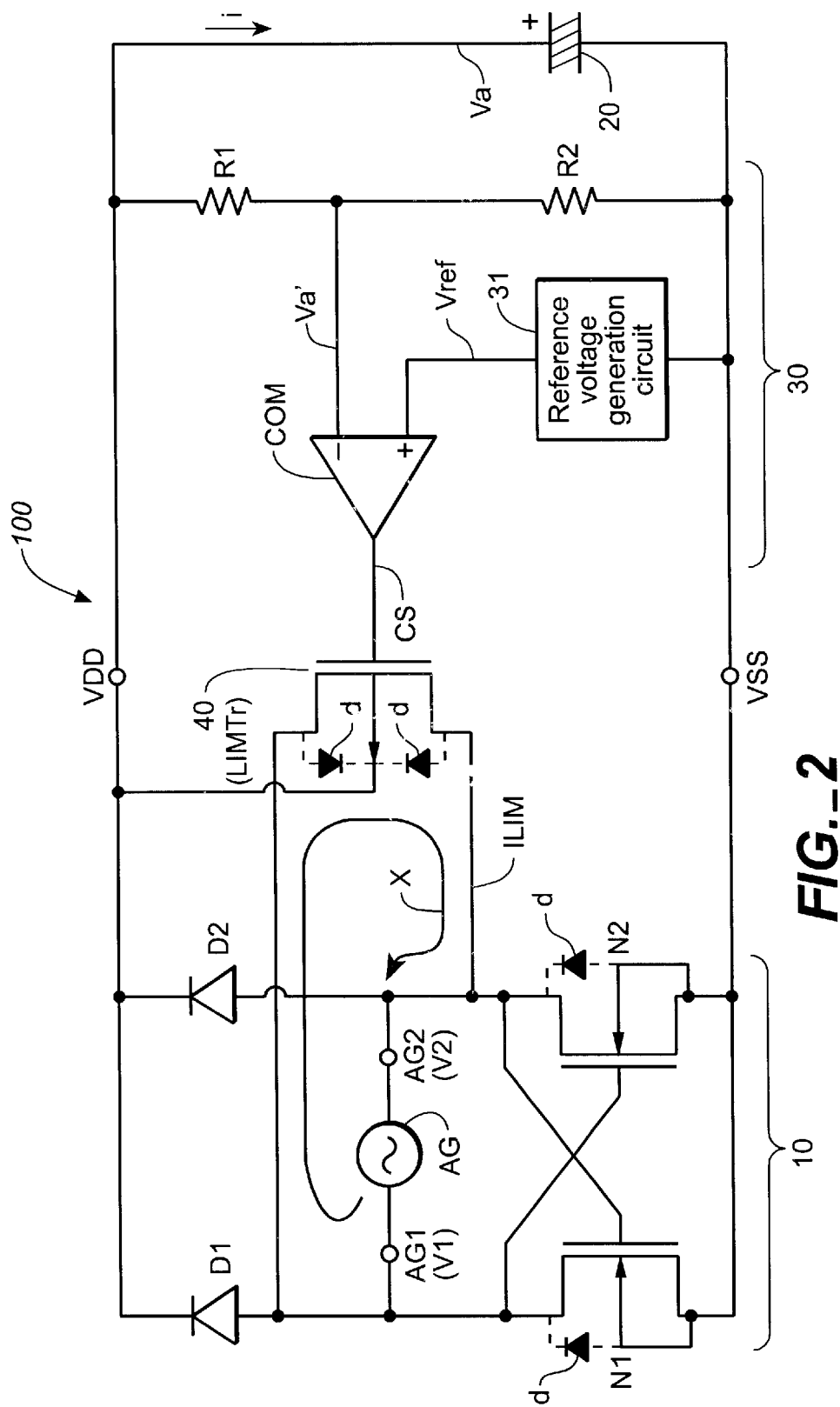
FIG._2

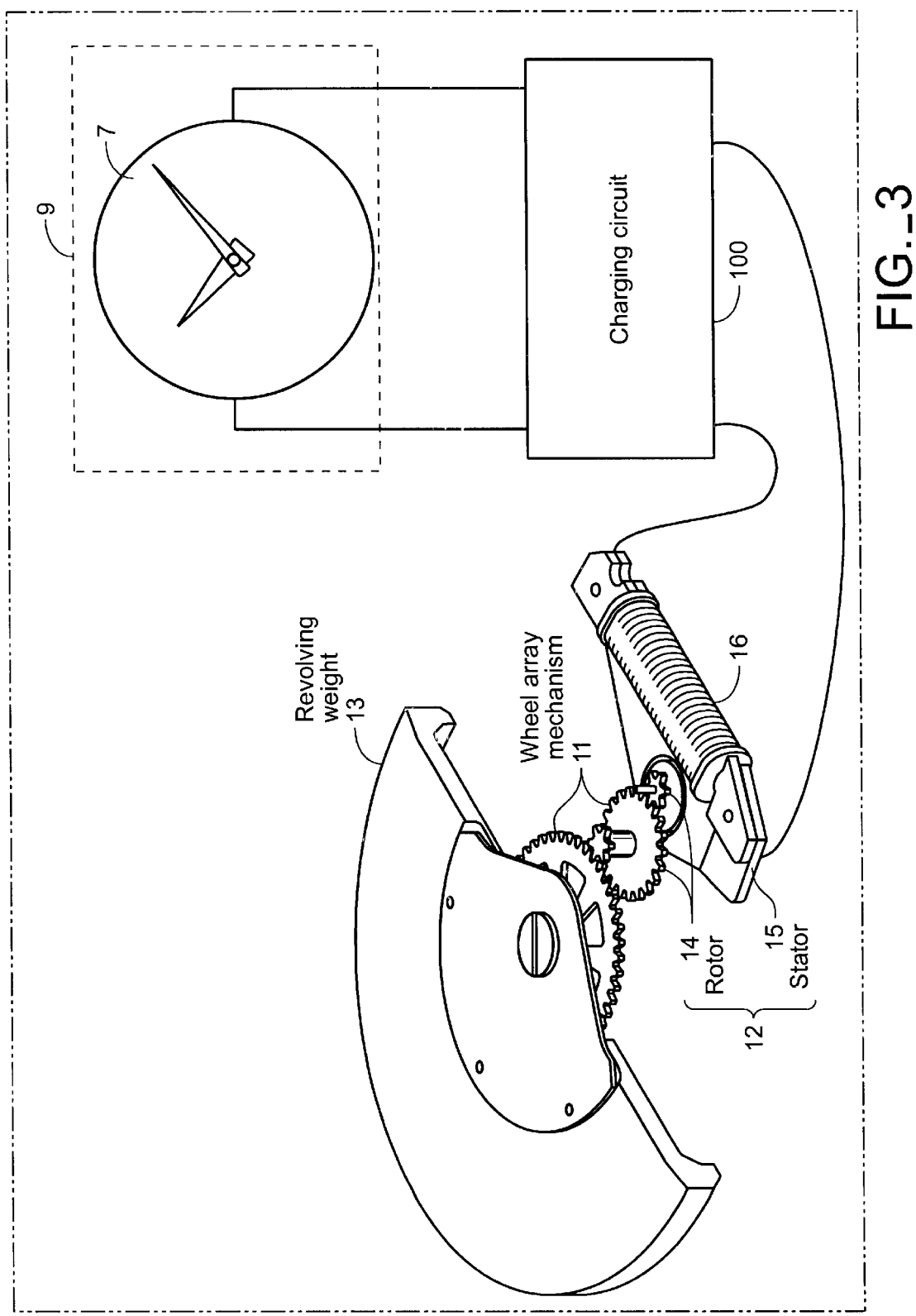
FIG._3

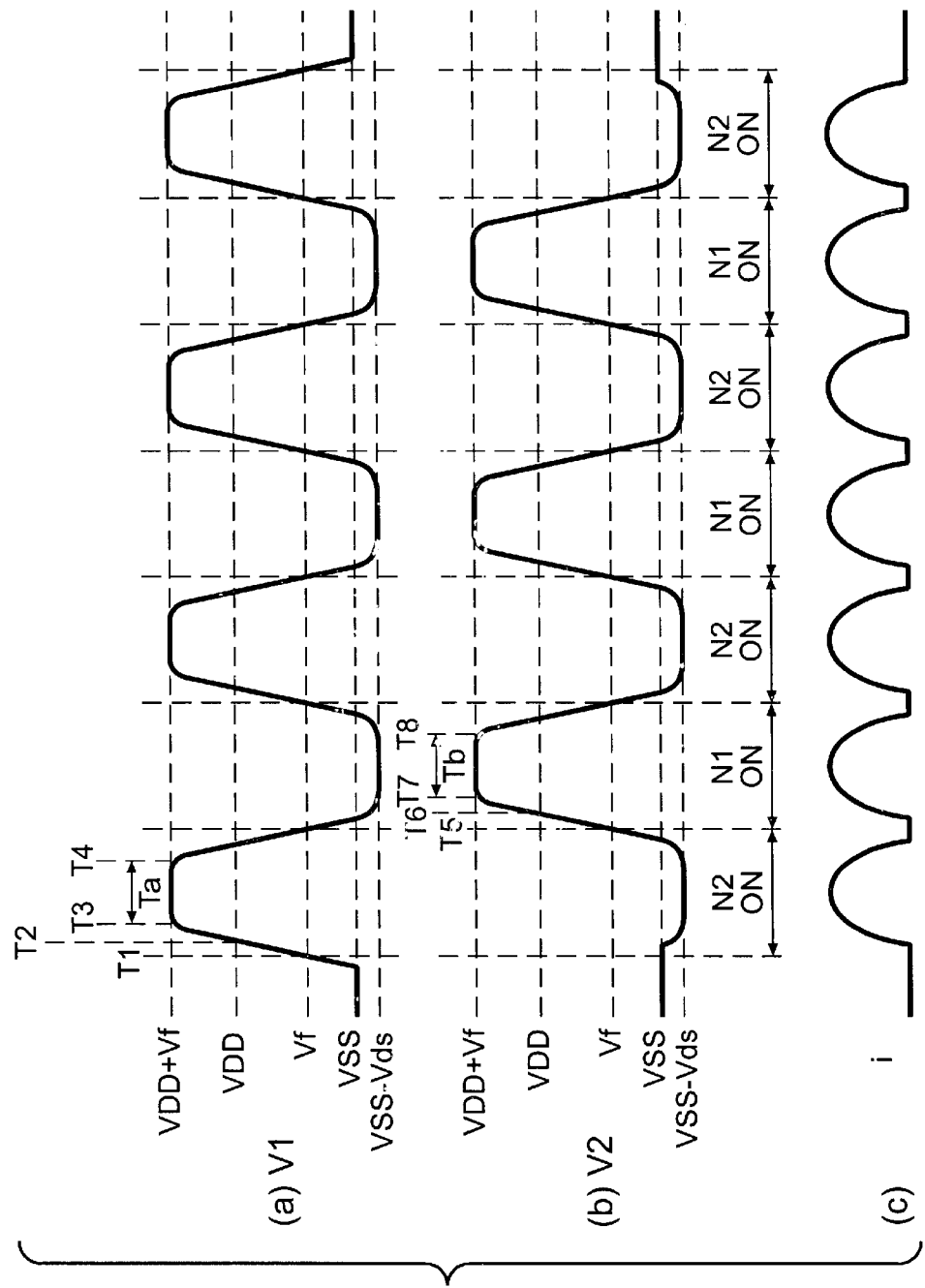
FIG._4

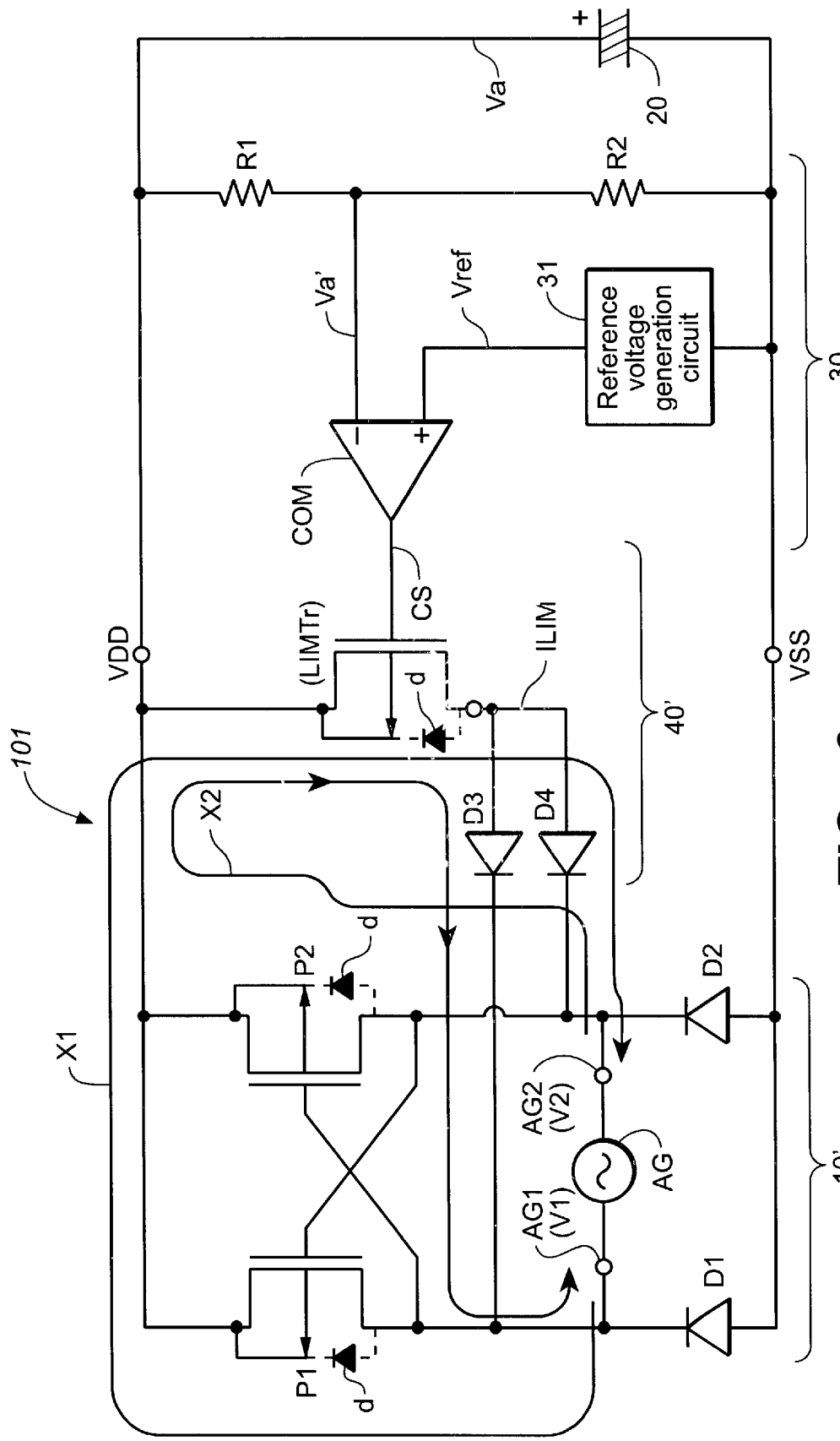
FIG._6

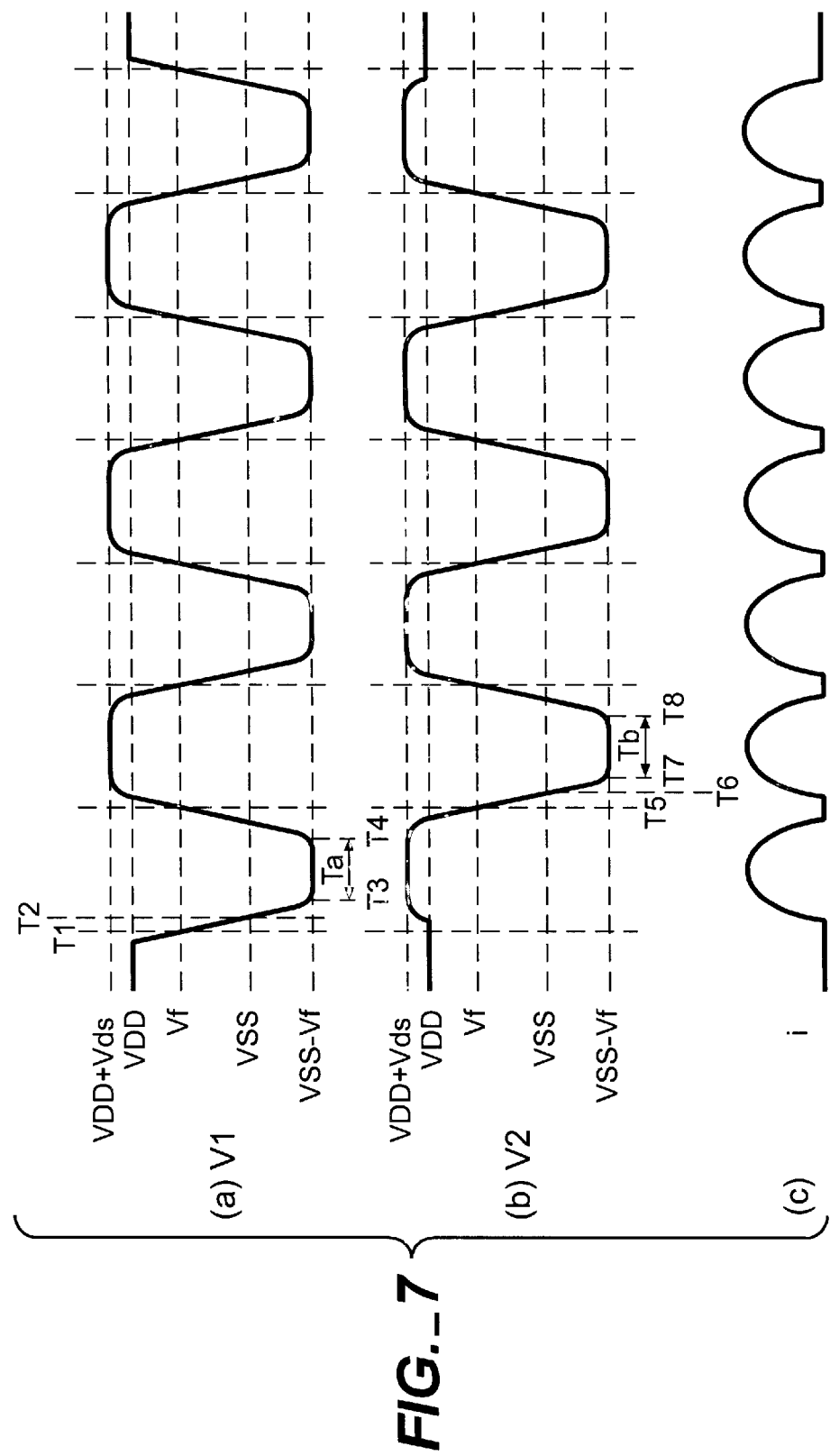
FIG._7

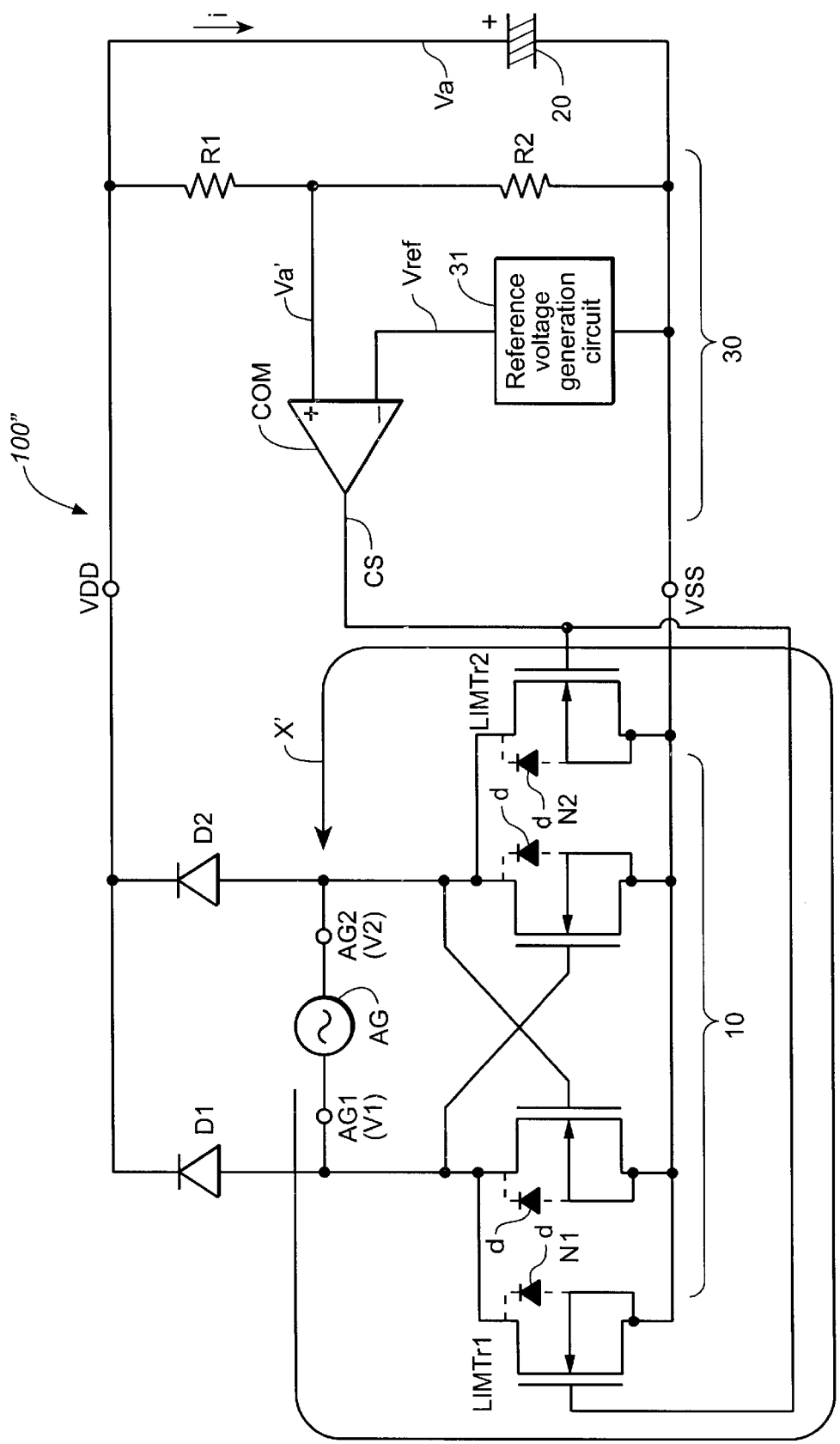
FIG._8

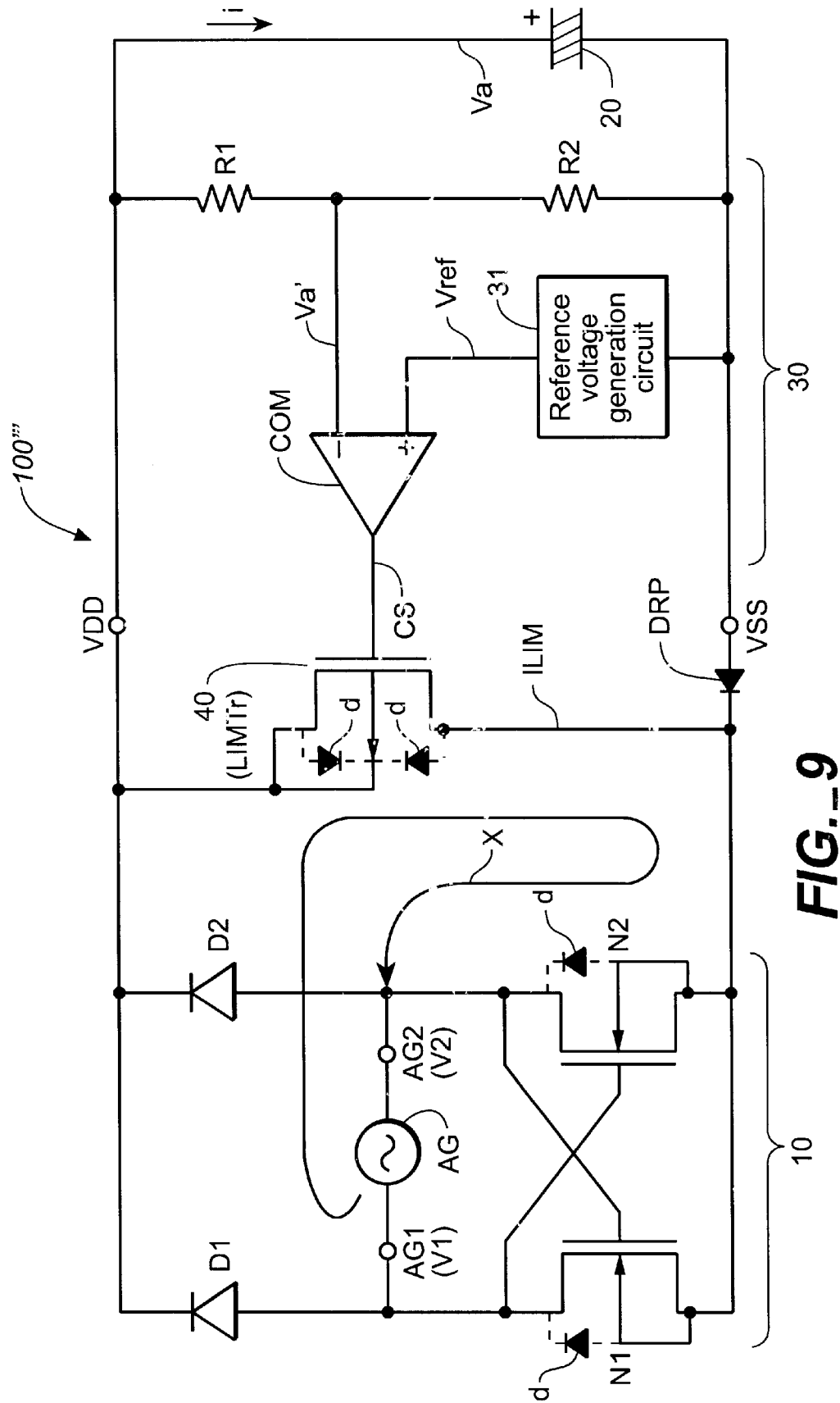
FIG._9

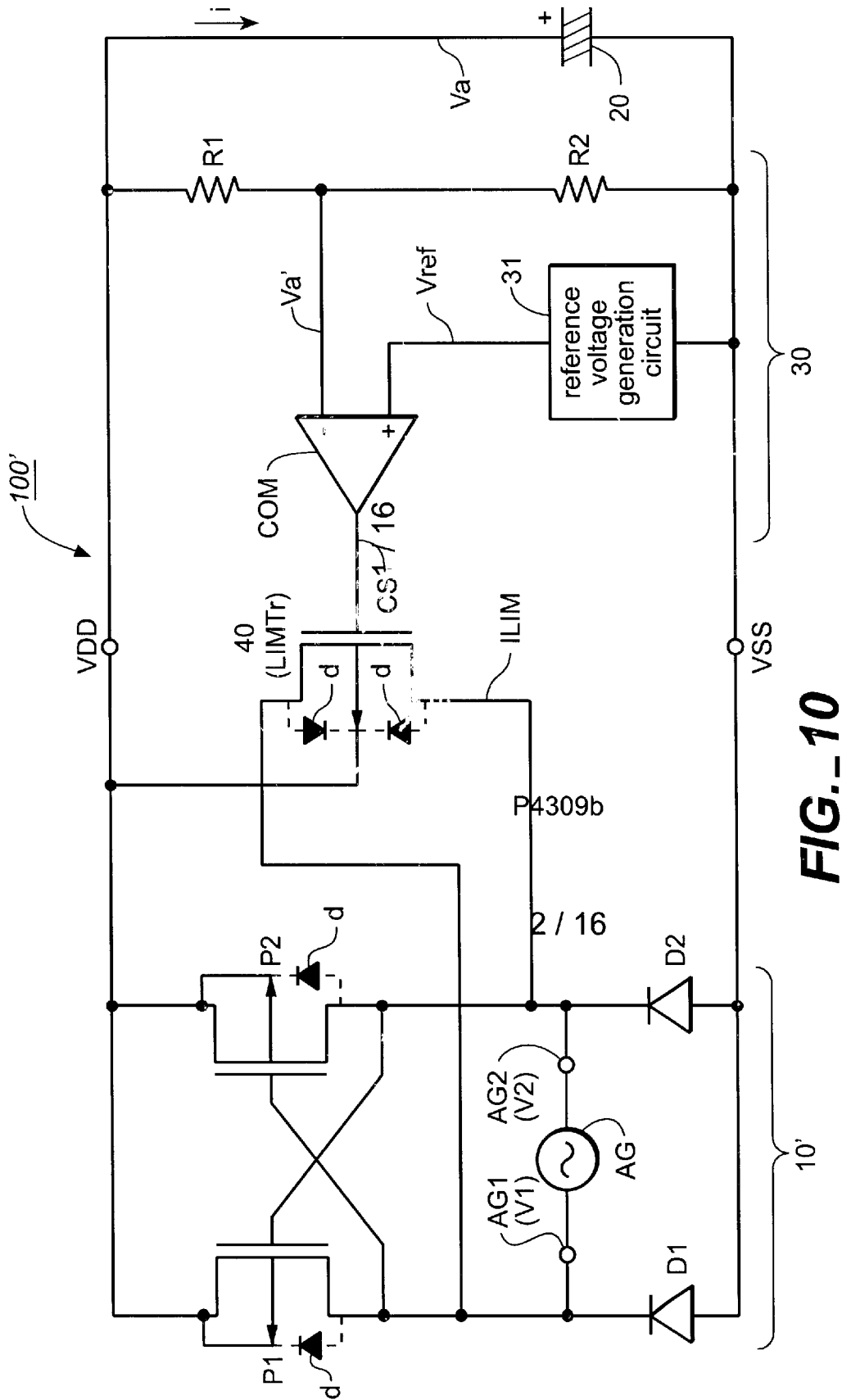
FIG._10

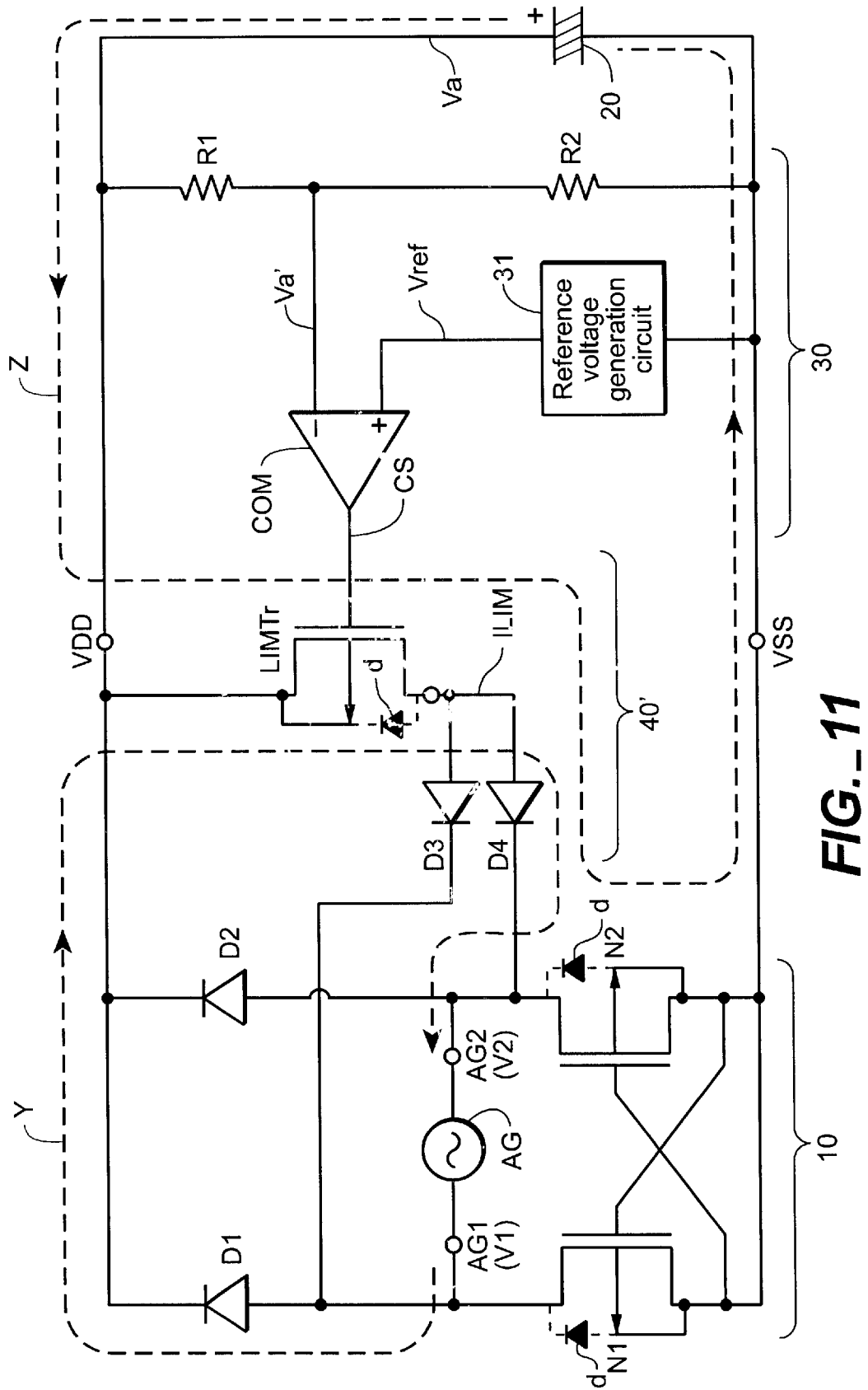
FIG._11

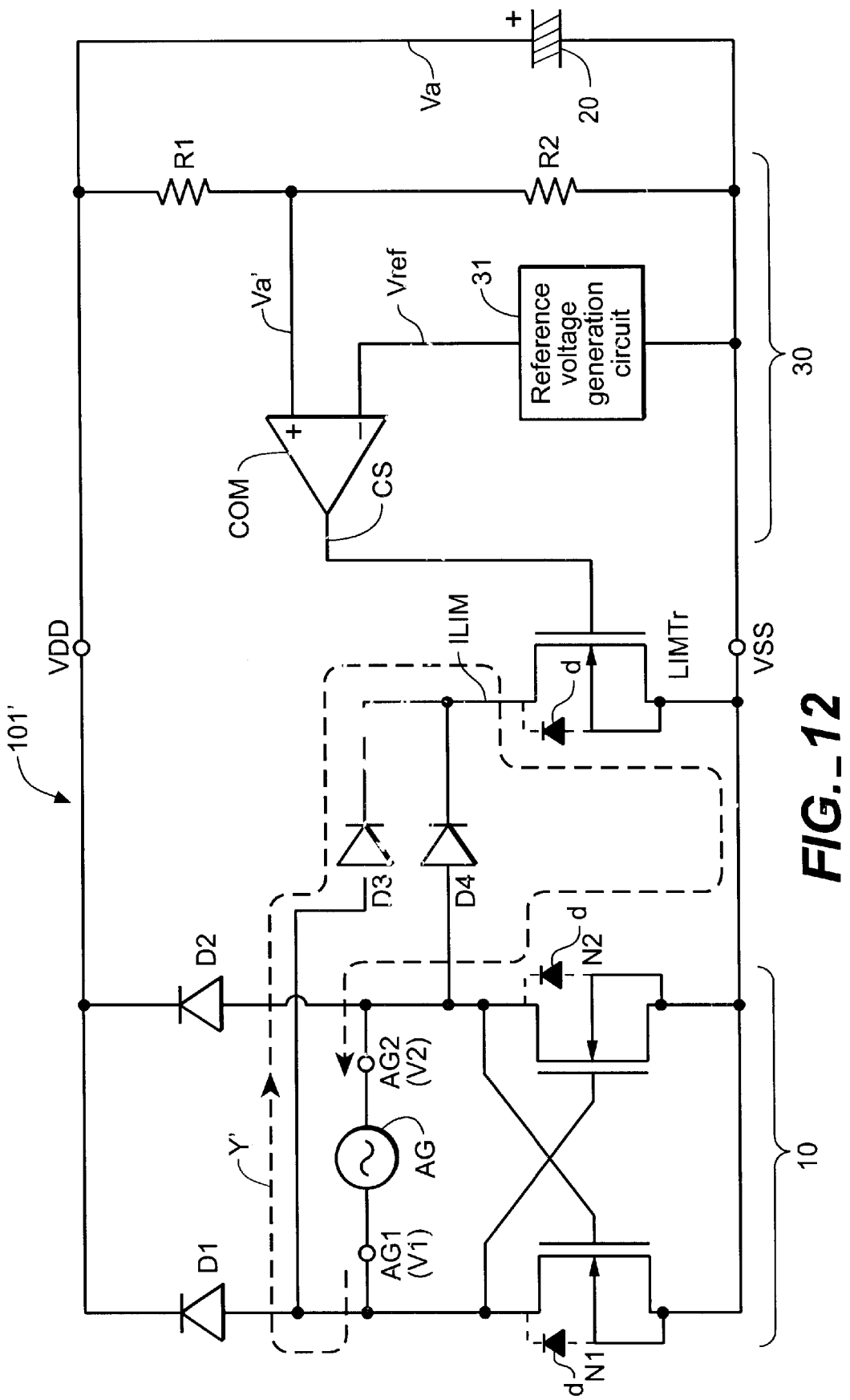
FIG._12

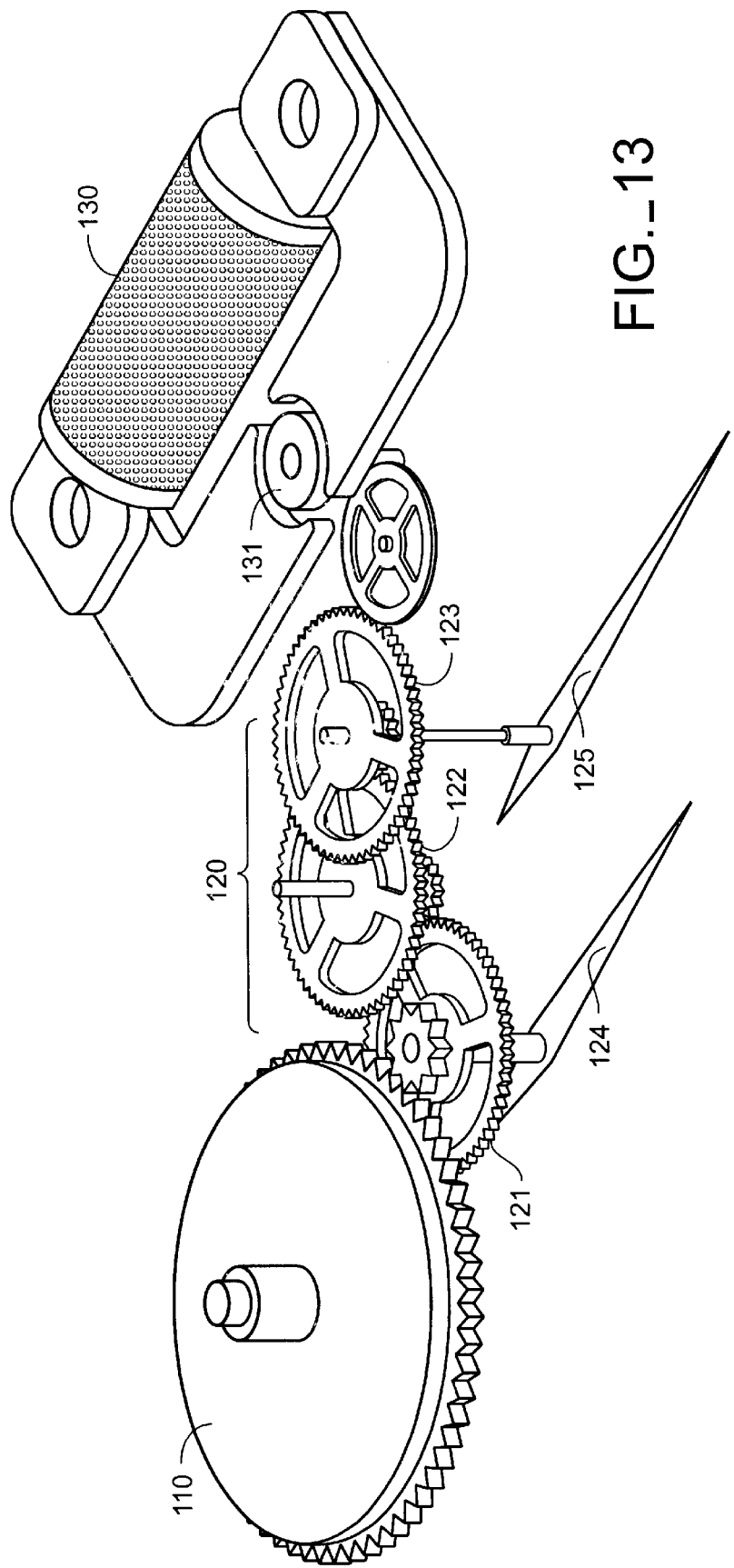

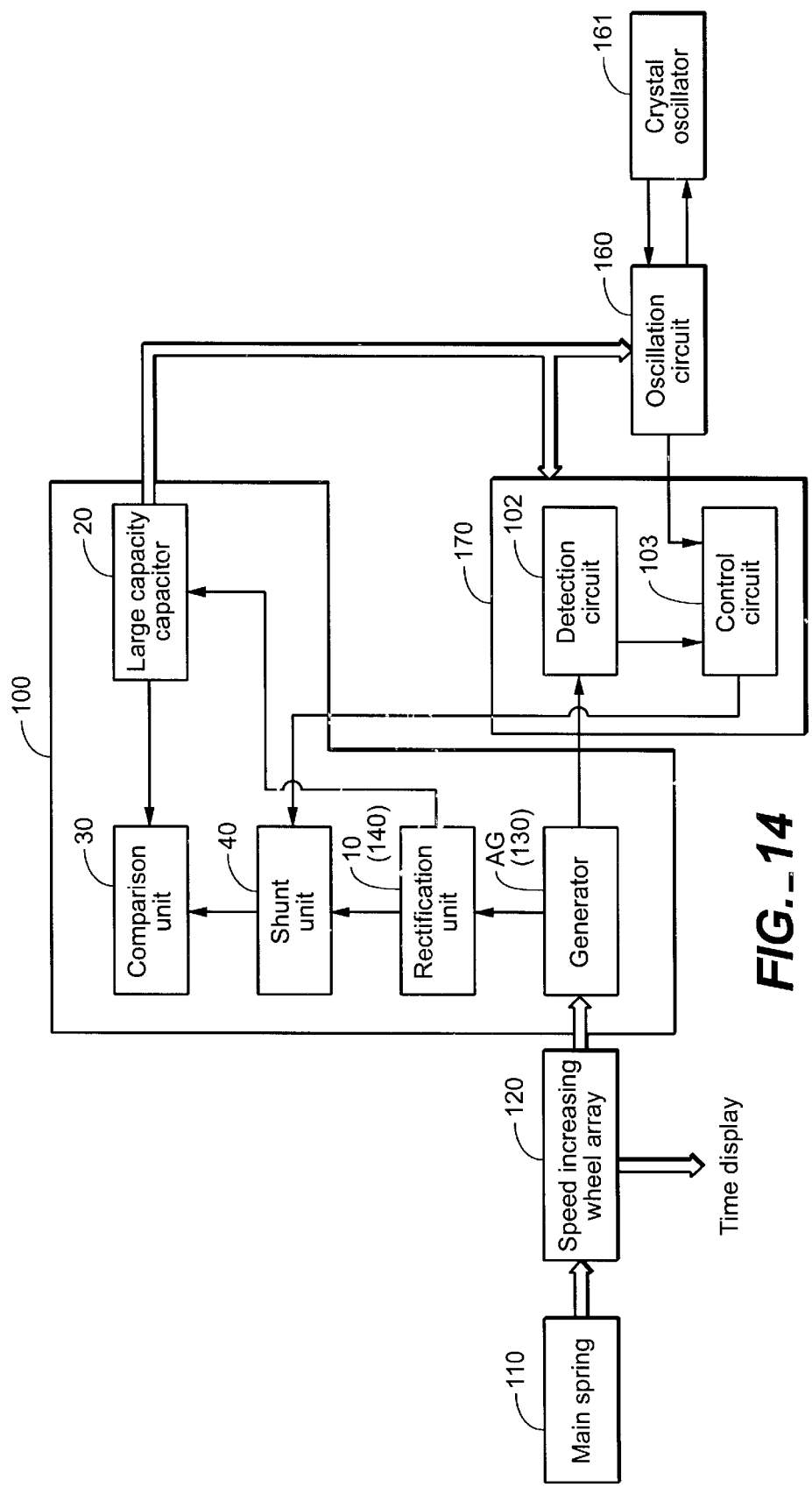
FIG._14

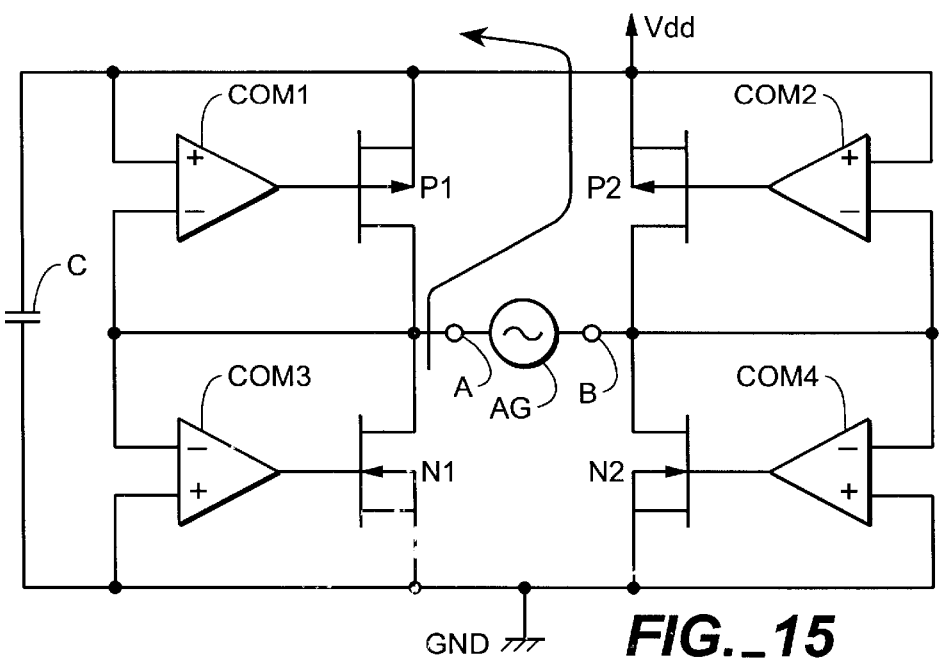
FIG._15
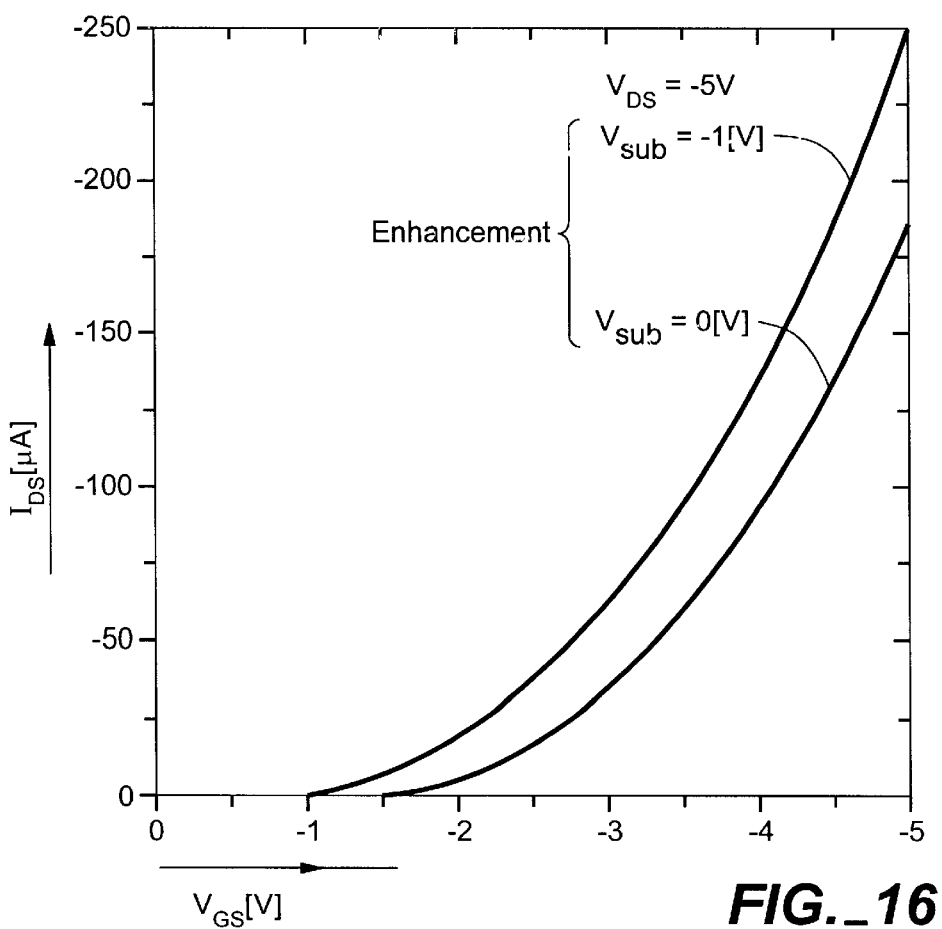
FIG._16

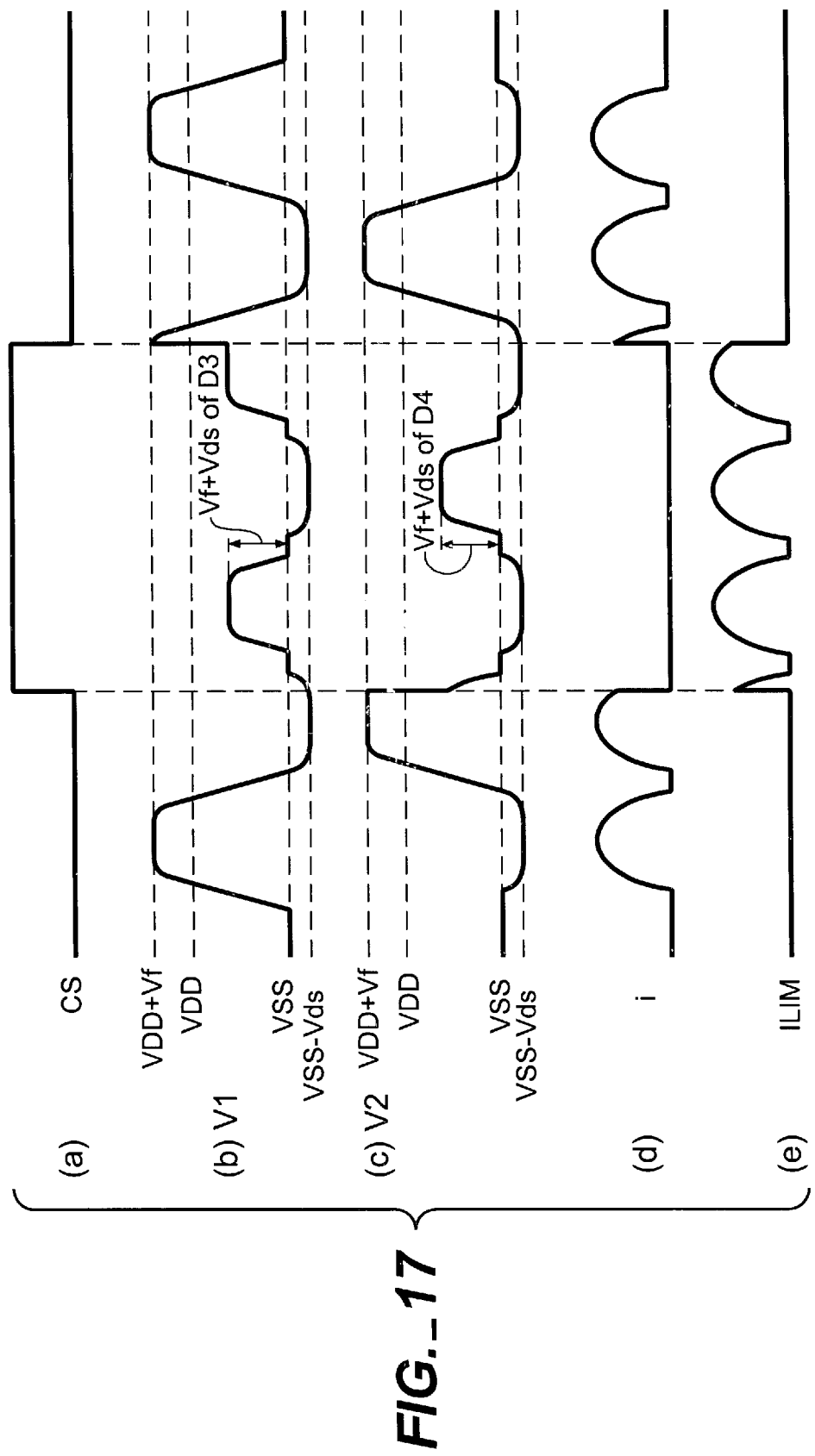
FIG._17

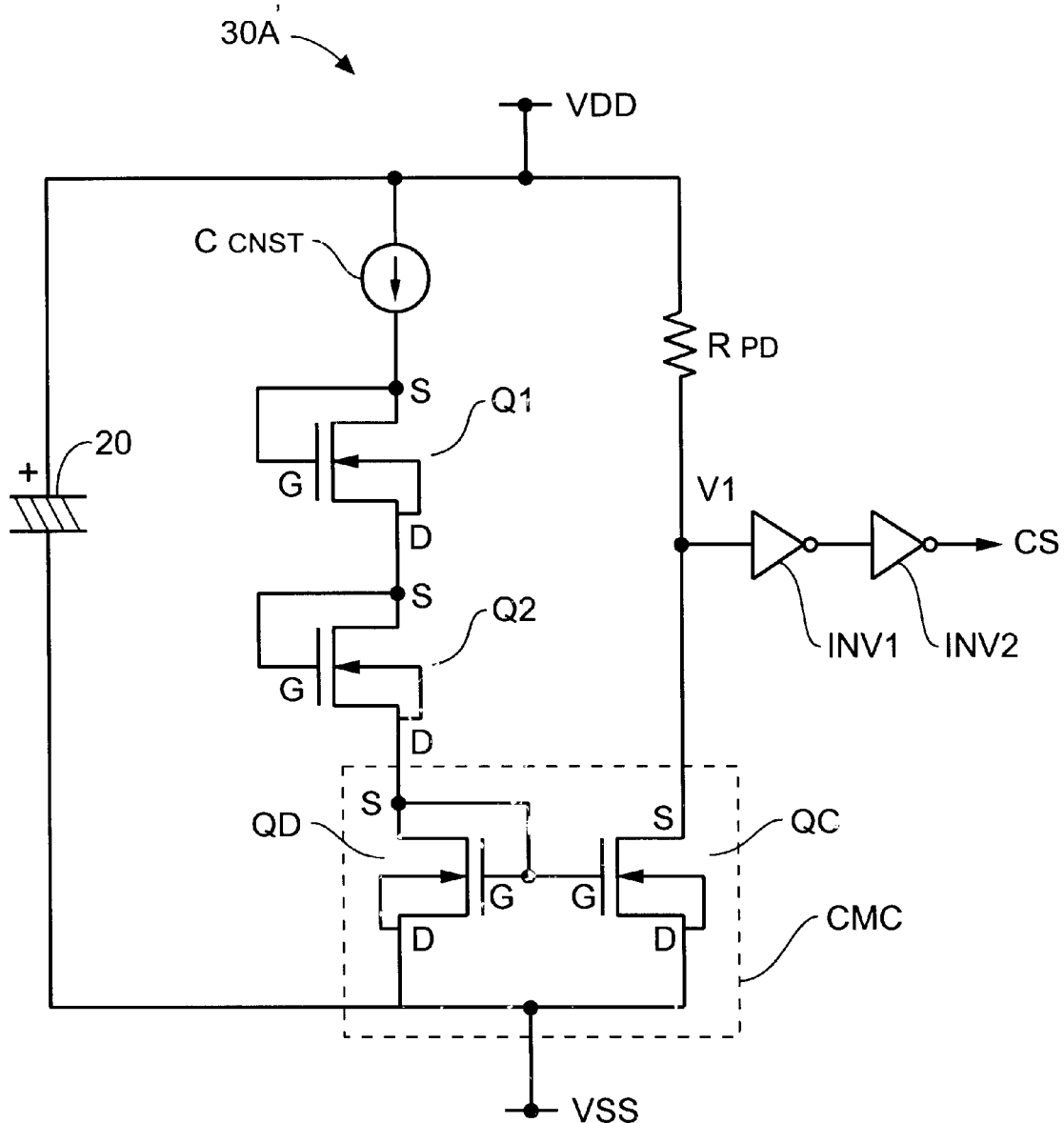
FIG._18

OVERCHARGE PREVENTION METHOD, CHARGING CIRCUIT, ELECTRONIC EQUIPMENT AND TIMEPIECE FOR PREVENTING OVERCHARGE OF A CHARGE STORAGE DEVICE

TECHNICAL FIELD

The present invention relates to an overcharge prevention method, which is suitable for preventing overcharging, a charging circuit, electronic equipment which uses the overcharge prevention method and the charging circuit, and a timepiece.

BACKGROUND ART

A diode bridge circuit is well known as a charging circuit that charges a large-capacity capacitor with an alternating voltage generated by a generator. In the diode bridge circuit, since losses for only two diode voltage drops are generated, it is not suitable for charging small amplitude alternating voltage.

Accordingly, a charging circuit which uses a transistor instead of diodes has been developed. For example, FIG. 15 is a circuit diagram of a conventional charging circuit. In this charging circuit, there are provided comparators COM1 and COM2 for comparing the voltages at output terminals A and B, respectively, of a generator AG with the power supply voltage Vdd, comparators COM3 and COM4 for comparing the voltages at the output terminals A and B, respectively, of the generator AG with the ground voltage GND, and a large-capacity capacitor C for storing a charging current. Then, switching ON/OFF of P-channel FETs P1 and P2 and N-channel FETs N1 and N2 is controlled according to the outputs of the respective comparators COM1 to COM4.

Herein, when the voltage at the output terminal A becomes equal to or less than the ground voltage GND, the N-channel FET N1 is turned ON by the comparator COM3, and the output terminal A is grounded. Further, when the voltage of the output terminal B exceeds the power supply voltage Vdd, the P-channel FET P2 is turned ON by the comparator COM2, and electrical charge flows into the capacitor C through a path indicated with the arrow. In this case, unless the voltage of the output terminal B exceeds the power supply voltage Vdd, the P-channel FET P2 will not turn ON, and it is arranged to prevent any problems from occurring such as a current flowing through a path opposite to the arrow, thereby deteriorating the charging efficiency.

Incidentally, in the charging circuit as described above, since switching ON/OFF of the respective field effect transistors (FETs) is controlled by the comparators COM1 to COM4, the configuration becomes complex, and the scale of the circuit and a current consumption increases.

On the other hand, there is a breakdown voltage for the large-capacity capacitor, and when the charging voltage exceeds a predetermined voltage, overcharging occurs, the large-capacity capacitor is degraded, and the charging efficiency drops.

It is an object of the present invention to provide an overcharge prevention method, which is capable of securely preventing overcharging with a simple configuration, and a charging circuit which is capable of securely preventing overcharging.

It is another object of the present invention to apply this charging circuit to electronic devices and a wristwatch.

DISCLOSURE OF THE INVENTION

The present invention is characterized in that an overcharge prevention method, which is adapted to be used in a charging circuit for charging electrical power into a charging element, using a rectifying circuit having a plurality of rectifying elements, which converts an alternating-current input from an external alternating-current power supply through a pair of input terminals to a direct-current and outputs the direct-current, characterized in that the method comprises the steps of detecting a charging voltage of the charging element; and shunting the pair of input terminals without passing through the plurality of rectifying elements when the detected charging voltage exceeds a predetermined voltage that is defined in advance.

Further, the present invention is characterized in that an overcharge prevention method, which is adapted to be used in a charging circuit for charging electrical power into a charging element, using a rectifying circuit having a plurality of rectifying elements, which converts an alternating current input from an external alternating-current power supply through a pair of input terminals to a direct current and outputs the direct current, characterized in that the method comprises the steps of detecting a charging voltage of the charging element; comparing the detected charging voltage with a reference voltage that is defined in advance; and shunting the pair of input terminals without passing through the plurality of rectifying elements when the detected charging voltage exceeds the reference voltage.

Further, the present invention is characterized in that an overcharge prevention method which is used in a charging circuit, the charging circuit comprising first and second switching means with which it is controlled whether or not, according to a terminal voltage at one of the input terminals to which an alternating-current voltage is supplied, the other one of the input terminals and a first power supply line are connected, first and second diodes which are connected between the respective input terminals and a second power supply line, and a charging element for rectifying the alternating-current voltage and for charging electrical power into the charging element, characterized in that the method comprises the steps of detecting a charging voltage of the charging element; comparing the detected charging voltage with a reference voltage that is defined in advance; and supplying a generator current that flows into one of the input terminals to the other one of the input terminals through a path that does not pass through the first and second diodes when the detected charging voltage exceeds the reference voltage.

Further, the present invention is characterized in that a generator current that flows into one of the input terminals is supplied to the other one of the input terminals through a path that does not pass through the first and second diodes by shunting both of the input terminals, when the detected charging voltage exceeds the reference voltage.

Moreover, the present invention is characterized in that a charging circuit for charging electrical power into a charging element, using a rectifying circuit having a plurality of rectifying elements, which converts an alternating-current input from an external alternating-current power supply through a pair of input terminals to a direct current and outputs the direct current, characterized in that the charging circuit comprises charging voltage detecting means for detecting a charging voltage of the charging element; and shunt means for shunting the pair of input terminals without passing through the plurality of rectifying elements when the detected charging voltage exceeds a predetermined voltage that is defined in advance.

Furthermore, the present invention is characterized in that a charging circuit for charging electrical power into a charging element, using a rectifying circuit having a plurality of rectifying elements, which converts an alternating current input from an external alternating-current power supply through a pair of input terminals to a direct current and outputs the direct current, characterized in that the charging circuit comprises charging voltage detecting means for detecting a charging voltage of the charging element; comparison means for comparing the detected charging voltage with a reference voltage that is defined in advance; and shunt means for shunting the pair of input terminals without passing through the plurality of rectifying elements when the detected charging voltage exceeds the reference voltage.

The present invention is further characterized in that a charging circuit for rectifying an alternating-current voltage supplied to first and second input terminals and for charging an electrical charge into a charging element that is provided between first and second power supply lines, comprising first switching means provided between the first input terminal and the first power supply line, in which ON/OFF switching thereof is controlled on the basis of a voltage at the second input terminal; second switching means provided between the second input terminal and the first power supply line, in which ON/OFF switching thereof is controlled on a basis of a voltage at the first input terminal; a first diode provided between the first input terminal and the second power supply line; a second diode provided between the second input terminal and the second power supply line; comparison means for detecting a charging voltage of the charging element, and for comparing the detected charging voltage with a reference voltage that is defined in advance; and shunt means for shunting the first input terminal and the second input terminal by supplying a generator current that is flown into one of the input terminals to the other one of the input terminals through a path that does not pass through the first and second diodes, based on a comparison result in the comparison means.

Further, the present invention is characterized in that the shunt means is a transistor provided between the first input terminal and the second input terminal.

The present invention is further characterized in that the shunt means comprises a third diode in which one end thereof is connected to the first input terminal; a fourth diode in which one end thereof is connected to the second input terminal; and a transistor which is connected to the other ends of the third and fourth diodes and is also connected to the first and second power source lines.

The present invention is further characterized in that a charging circuit for rectifying an alternating-current voltage supplied to first and second input terminals and for charging electrical power into a charging element that is provided between a high-potential power supply line and a low-potential power supply line, comprising a first diode in which an anode thereof is connected to the first input terminal, and a cathode thereof is connected to the high-potential power supply line; a second diode in which an anode thereof is connected to the second input terminal, and a cathode thereof is connected to the high-potential power supply line; a first N-channel field effect transistor in which a drain thereof is connected to the first input terminal, a source thereof is connected to the low-potential power supply line, and a gate thereof is connected to the second input terminal; a second N-channel field effect transistor in which a drain thereof is connected to the second input terminal, a source thereof is connected to the low-potential power supply line, and a gate thereof is connected to the first input terminal; a comparator for comparing a charging voltage of the charging element with a reference voltage that is defined in advance, and a transmission gate provided between the first and second input terminals, in which ON/OFF switching thereof is controlled on the basis of a comparison result of the comparator.

The present invention is further characterized in that a charging circuit for rectifying an alternating-current voltage supplied to first and second input terminals and for charging electrical power into a charging element that is provided between a high-potential power supply line and a low-potential power supply line, comprising a first diode in which a cathode thereof is connected to the first input terminal, and an anode thereof is connected to the low-potential power supply line; a second diode in which a cathode thereof is connected to the second input terminal, and an anode thereof is connected to the low-potential power supply line; a first P-channel field effect transistor in which a drain thereof is connected to the first input terminal, a source thereof is connected to the high-potential power supply line, and a gate thereof is connected to the second input terminal; a second P-channel field effect transistor in which a drain thereof is connected to the second input terminal, a source thereof is connected to the high-potential power supply line, and a gate thereof is connected to the first input terminal; a comparator for comparing a charging voltage of the charging element with a reference voltage that is defined in advance, and a transmission gate provided between the first and second input terminals, in which ON/OFF switching thereof is controlled on a basis of a comparison result of the comparator.

Further, the present invention is characterized in that a charging circuit for rectifying an alternating-current voltage supplied to first and second input terminals and for charging electrical power into a charging element that is provided between a high-potential power supply line a low-potential power supply line, comprising a first diode in which an anode thereof is connected to the first input terminal, and a cathode thereof is connected to the high-potential power supply line; a second diode in which an anode thereof is connected to the second input terminal, and a cathode thereof is connected to the high-potential power supply line; a first N-channel field effect transistor in which a drain thereof is connected to the first input terminal, a source thereof is connected to the low-potential power supply line, and a gate thereof is connected to the second input terminal; a second N-channel field effect transistor in which a drain thereof is connected to the second input terminal, a source thereof is connected to the low-potential power supply line, and a gate thereof is connected to the first input terminal; a comparator for comparing a charging voltage of the charging element with a reference voltage that is defined in advance; a third diode in which an anode thereof is connected to the first input terminal; a fourth diode in which an anode thereof is connected to the second input terminal; and a third N-channel field effect transistor in which a drain thereof is connected to cathodes of the third and fourth diodes, a source thereof is connected to the low-potential power supply line, and a comparison result of the comparator is supplied to a gate thereof.

Moreover, the present invention is characterized in that a charging circuit for rectifying an alternating-current voltage supplied to first and second input terminals and for charging electrical power into a charging element that is provided between a high-potential power supply line and a low-potential power supply line, comprising a first diode in which a cathode thereof is connected to the first input terminal, and an anode thereof is connected to the low-potential power supply line; a second diode in which a cathode thereof is connected to the second input terminal, and an anode thereof is connected to the low-potential power supply line; a first P-channel field effect transistor in which a drain thereof is connected to the first input terminal, a source thereof is connected to the high-potential power supply line, and a gate thereof is connected to the second input terminal; a second P-channel field effect transistor in which a drain thereof is connected to the second input terminal, a source thereof is connected to the high-potential power supply line, and a gate thereof is connected to the first input terminal; a comparator for comparing a charging voltage of the charging element with a reference voltage that is defined in advance; a third diode in which a cathode thereof is connected to the first input terminal; a fourth diode in which a cathode thereof is connected to the second input terminal; and a third P-channel field effect transistor in which a drain thereof is connected to anodes of the third and fourth diodes, a source thereof is connected to the high-potential power supply line, and a comparison result of the comparator is supplied to a gate thereof.

The present invention is further characterized in that a charging circuit for rectifying an alternating-current voltage supplied to first and second input terminals and for charging electrical power into a charging element that is provided between a high-potential power supply line and a low-potential power supply line, comprising a first diode in which an anode thereof is connected to the first input terminal, and a cathode thereof is connected to the high-potential power supply line; a second diode in which an anode thereof is connected to the second input terminal, and a cathode thereof is connected to the high-potential power supply line; a first N-channel field effect transistor in which a drain thereof is connected to the first input terminal, a source thereof is connected to the low-potential power supply line, and a gate thereof is connected to the second input terminal; a second N-channel field effect transistor in which a drain thereof is connected to the second input terminal, a source thereof is connected to the low-potential power supply line, and a gate thereof is connected to the first input terminal; a comparator for comparing a charging voltage of the charging element with a reference voltage that is defined in advance; a third N-channel field effect transistor in which a drain thereof is connected to the first input terminal, a source thereof is connected to the low-potential power supply line, and a gate thereof is connected to an output terminal of the comparator; and a fourth N-channel field effect transistor in which a drain thereof is connected to the second input terminal, a source thereof is connected to the low-potential power supply line, and a gate thereof is connected to an output terminal of the comparator.

An electronic equipment of the present invention is characterized in that there is installed a charging circuit according to the respective embodiments described above and operates in accordance with electrical power that is supplied from the charging circuit.

A timepiece of the present invention is characterized in that there is installed a charging circuit according to the respective embodiments described above and includes a clock circuit that measures time in accordance with electrical power that is supplied from the charging circuit.

BRIEF DESCRIPTION OF DRAWINGS

FIG. 1 is a diagram for illustrating the principle of a first embodiment of the present invention;

FIG. 2 is a circuit diagram of a charging circuit that is used in a wristwatch according to the first embodiment of the present invention;

FIG. 3 is a perspective view showing the configurations of an AC generator and a peripheral mechanism thereof according to the first embodiment of the present invention;

FIG. 4 is a timing chart showing a charging operation of the charging circuit according to the first embodiment of the present invention;

FIG. 5 is a process flowchart for illustrating an operation of a limiter transistor according to the first embodiment of the present invention;

FIG. 6 is a circuit diagram of a charging circuit that is used in a wristwatch according to a second embodiment of the present invention;

FIG. 7 is a timing chart showing a charging operation of the charging circuit according to the second embodiment of the present invention;

FIG. 8 is a circuit diagram of a charging circuit that is used in a wristwatch according to a third embodiment of the present invention;

FIG. 9 is a circuit diagram of a charging circuit that is used in a wristwatch according to a fourth embodiment of the present invention;

FIG. 10 is a circuit diagram showing a configuration of a charging circuit according to an alternate example of the first embodiment of the present invention;

FIG. 11 is a circuit diagram showing a configuration of a charging circuit according to a comparative example for the alternate example of the second embodiment of the present invention;

FIG. 12 is a circuit diagram showing a configuration of a charging circuit according to an alternate example of the second embodiment of the present invention;

FIG. 13 is a perspective view showing a mechanical structure of an electronics-controlled mechanical watch according to the alternate example;

FIG. 14 is a block diagram showing an electrical configuration of the electronics-controlled mechanical watch according to the alternate example;

FIG. 15 is a circuit diagram of a conventional charging circuit;

FIG. 16 is a diagram for illustrating a back gate effect;

FIG. 17 is a timing chart of a charging circuit according to an alternate example of the second embodiment of the present invention; and FIG. 18 is a circuit diagram showing a voltage-detection discrimination unit according to a fifth embodiment of the present invention.

BEST MODE FOR CARRYING OUT THE INVENTION

A. FIRST EMBODIMENT

1. Configuration Principle of First Embodiment

FIG. 1 is a diagram for illustrating the principle of a charging circuit that is used in a wristwatch according to a first embodiment.

The main part of the charging circuit 100 is comprised of a rectification unit 10 for rectifying a generated voltage of an AC generator AG, a large-capacity capacitor 20 for storing a charging current, a voltage-detection determination unit 30A for detecting a charging voltage Va of the large-capacity capacitor 20 and for outputting a control signal CS to control whether or not input terminals AG1 and AG2 are shunted based on the detected charging voltage Va, and a shunt unit 40 for shunting the input terminals AG1 and AG2 based on the detection result. Further, d shown in the figure denotes a parasitic diode.

1-1: Overcharge Prevention Operation

In the following, an outline of the overcharge prevention operation will be described.

Since a charging current i flows into the large-capacity capacitor 20 when charging is performed, a charging voltage Va thereof gradually increases.

In this case, the voltage-detection determination unit 30A is arranged such that the control signal CS for shunting the input terminals AG1 and AG2 is output when the charging voltage Va exceeds a predetermined voltage, or it is arranged such that it determines whether or not the charging voltage Va exceeds the predetermined voltage, and the control signal CS for shunting the input terminals AG1 and AG2 is output if it determines that exceeding occurs.

As a result, the shunt unit 40 operates, and the input terminals AG1 and AG2 are shunted, and, for example, when the terminal voltage AG1 (V1) increases and the terminal voltage AG2 (V2) decreases, a limiter current ILIM flows through the path indicated by an arrow X in the figure.

Accordingly, no charging current i flows into the large-capacity capacitor 20, thereby preventing overcharging.

2. Configuration of First Embodiment

FIG. 2 is a circuit diagram of a charging circuit that is used in a wristwatch according to the first embodiment.

The main parts of the charging circuit 100 is comprised of a rectification unit 10 for rectifying a generator voltage of an AC generator AG, the large-capacity capacitor 20 for storing a charging current, a comparison unit 30 (which is voltage-detecting determination unit 30A) for detecting a charging voltage Va of the large-capacity capacitor 20 by comparing the stepped-down charging voltage Va' with a reference voltage Vref, and the shunt unit 40 for shunting the input terminals AG1 and AG2 based on the detection result of the comparison unit 30. Further, d shown in the figure denotes a parasitic diode.

At first, the rectification unit 10 is configured as a bridge-type full-wave rectifying circuit, and is arranged such that the generator voltage of the AC generator AG is supplied to the input terminals AG1 and AG2. The input terminals AG1 and AG2 are connected to the anodes of diodes D1 and D2, respectively, in which the cathodes thereof are connected to a high-potential power supply line VDD. As a result, the diodes D1 and D2 turn ON when the terminal voltages V1 and V2 of the input terminals AG1 and AG2 exceed the total values of the charging voltage Va and the voltage drop Vf of the diodes D1 and D2.

Further, enhancement-type N-channel FETs N1 and N2, are provided between the input terminals AG1 and AG2 and a low-potential power supply line VSS. A gate of the N-channel FET N1 is connected to the input terminal AG2, while a gate of the N-channel FET N2 is connected to the input terminal AG1. The N-channel FETs N1 and N2 have identical electrical characteristics, and the threshold voltages thereof are Vt.

Accordingly, if the generator voltage is supplied from the AC generator AG, the terminal voltage V2 exceeds the terminal voltage V1, and the terminal voltage V2 exceeds the threshold voltage Vt, then the N-channel FET N1 turns ON. At this moment, the N-channel FET N2 is OFF. Further, if the amplitude of the generator voltage is extremely small, the diode D2 should be OFF. If the generated voltage increases gradually, and the terminal voltage V2 exceeds the total value of the charging voltage Va and the voltage drop Vf of the diode D2, the diode D2 turns ON. Then, the charging current i flows through the path: "the input terminal AG2→the diode D2→the high-potential power supply line VDD→the large-capacity capacitor 20→the low-potential power supply line VSS→the N-channel FET N1→the input terminal AG1", and the electrical charge changes the large-capacity capacitor 20. Furthermore, on the other hand, if the terminal voltage V1 exceeds the terminal voltage V2, then the charging current i flows through the path: "the input terminal AG1→the diode D1→the high-potential power supply line VDD→the large-capacity capacitor 20→the low-potential power supply line VSS→the N-channel FET N2→the input terminal AG2", and the electrical charge charges the large-capacity capacitor 20.

This rectification unit 10 has an advantage that the circuit size of the charging circuit is small because it does not require the comparators COM1 to COM4, as in the conventional charging circuit shown in FIG. 15, and also it has an advantage that it can charge efficiently even if the amplitude of the generator voltage is small because the voltage loss is smaller compared with the diode bridge circuit.

The large-capacity capacitor 20 is composed of, for example, a chargeable secondary battery, and has a certain breakdown voltage. If charging is performed to exceed the breakdown voltage, overcharging occurs, and the large-capacity capacitor 20 deteriorates, and thereby the charging efficiency degrades.

The comparator, that is the comparison unit, 30 is comprised of a comparator COM, resistors R1 and R2 that divide the charging voltage Va, and a reference-voltage generation circuit 31 that generates a reference voltage Vref. On one hand, the reference voltage Vref is supplied to a positive input terminal of the comparator COM, and on the other hand, a voltage Va' (=Va·R2/(R1+R2)) that is divided by the resistors R1 and R2 is supplied to a negative input terminal thereof. The comparator COM compares the reference voltage Vref and the voltage Va', and generates a control signal CS. If the voltage Va' exceeds the reference voltage Vref, the control signal CS becomes low, and on the other hand, if the voltage Va' is less than the reference Vref, the control signal CS becomes high. Herein, the reference Vref is set such that the large-capacity capacitor 20 is not overcharged, by considering the breakdown voltage of the large-capacity capacitor 20. Further, the reason why it is arranged to compare the charging voltage Va with the voltage Va', but not to compare it directly with the reference voltage Vref, is that the ease of producing the reference voltage Vref is considered.

The shunt unit 40 is composed of a limiter transistor LIMTr. As the limiter transistor LIMTr, a P-channel enhancement-type transmission gate transistor is used, and it is connected to the input terminals AG1 and AG2. Switching ON/OFF of the transmission gate transistor is controlled by a gate voltage thereof, and has bi-directionality of input/output. In the present example, since it is comprised of a P-channel, it turns ON (connected) when the control signal CS is in a low level, and turns OFF (open) when the control signal CS is in a high level. Accordingly, if the charging voltage Va exceeds a predetermined voltage, the input terminals AG1 and AG2 are connected, and a limiter current ILIM flows, so as to prevent the charging current i from flowing into the large-capacity capacitor 20.

In the following, the configurations of the AC generator AG and a peripheral mechanism thereof will be described. FIG. 3 is a perspective view showing the configurations of the AC generator AG and the peripheral mechanism thereof. As shown in the figure, the AC generator AG12 is provided with a rotor 14 and a stator 15, and it is arranged that an electromotive force is generated in an outputting coil 16 of the stator 15 when the dipole-magnetized disk shaped rotor 14 rotates, thereby an AC output can be extracted. Further, in the figure, the numeral 13 denotes a revolving weight that performs a rotational movement within a wristwatch body case, the numeral 11 denotes a wheel array mechanism that transmits the rotational movement of the revolving weight 13 to the AC generator AG. The revolving weight 13 is arranged such that it rotates in response to the swing of a person's arm who wears the wristwatch, thereby enabling an electromotive force to be obtained from the AC generator AG.

An AC (alternating current) that is output from the AC generator AG is rectified in the charging circuit 100, and is supplied to a processing device 9. The processing device 9 drives a watch device 7 by the electrical power that is discharged from the charging circuit 100. Further, even when the AC generator AG is in a non-generating state, the processing device 9 and the watch device 7 are driven by the electrical power supplied from the large-capacity capacitor 20. This watch device 7 is comprised of a crystal oscillator, a counter circuit and the like, and is arranged such that a master clock signal generated in the crystal oscillator is frequency divided in the counter circuit, and time is measured on a basis of this frequency-divided result.

3. Operation of First Embodiment

In the following, with reference to the drawings, an operation of a wristwatch according to the first embodiment will be described.

3-1: Charging Operation

FIG. 4 is a timing chart showing a charging operation of the charging circuit. When the AC generator AG begins generating electricity, the generator voltage is supplied to both of the input terminals AG1 and AG2. In this case, the terminal voltage V1 at the input terminal AG1 and the terminal voltage V2 at the input terminal AG2 are such that the phases thereof are reversed, as shown in 4(a) and (b). Further, Vt in the figure denotes a threshold voltage of the N-channel FETs N1 and N2.

As shown in the figure, when the terminal voltage V1 exceeds the threshold voltage Vt at time T1, the N-channel FET N2 turns ON. Thereafter, the terminal voltage V1 rises, and then exceeds the voltage of the high-potential power supply line VDD at time T2, and further, when it rises by an amount of the voltage drop Vf of the diode D1 (at time T3), the diode D1 turns ON. At this moment, since the terminal voltage V2 is below the threshold voltage Vt, the N-channel FET N1 is turned OFF. Accordingly, during the period of time Ta (T3 to T4) while the diode D1 is ON, the charging current i flows through the path: "the input terminal AG1→the diode D1→the high-potential power supply line VDD→the large-capacity capacitor 20→the low-potential power supply line VSS→the N-channel FET N2", and the electric charge charges the large-capacity capacitor 20.

Thereafter, on the other hand, the terminal voltage V2 rises when the terminal voltage V1 falls, and the terminal voltage V2 exceeds the threshold voltage Vt at time T5. Then, the N-channel FET N1 turns ON. Thereafter, the terminal voltage V2 rises and exceeds the high-potential power supply line VDD at time T6, and further when it rises by an amount of the voltage drop Vf of the diode D2 (at time T7), the diode D2 turns ON. At this moment, since the terminal voltage V1 is below the threshold voltage Vt, the N-channel FET N2 turns OFF. Accordingly, during the period of time Tb (T7 to T8) while the diode D2 is ON, the charging current i flows through the path: "the input terminal AG2→the diode D2→the high-potential power supply line VDD→the large-capacity capacitor 20→the low-potential power supply line VSS→the N-channel FET N1", and the electric charge charges the large-capacity capacitor 20. As a result, the generator voltage is full-wave rectified, and thus the charging current i shown in (c) is obtained.

3-2: Overcharge Prevention Operation

In the following, an overcharge prevention operation will be described with reference to the process flowcharts in FIGS. 2 and 5.

Since the charging current i flows into the large-capacity capacitor 20 when the above-described charging is performed, the charging voltage Va thereof rises gradually. The comparator COM in the comparison unit 30 compares the voltage Va' (=Va·R2/(R1+R2)), of which the charging voltage Va is divided by the resistors R1 and R2, with the reference voltage Vref (step S1), and sets the control signal CS to a low level when the former exceeds the latter.

As a result, because the limiter transistor LIMTr switches from OFF to ON (step S2), the input terminals AG1 and AG2 are shunted, and, for example, when the terminal voltage AG1 (V1) rises and the terminal voltage AG2 (V2) falls, the limiter current ILIM flows through the path as indicated by an arrow X in the figure.

Overvoltage detection is a detection operation which may be performed by sampling even when the detection is not constantly performed. More concretely, the comparator COM and the resistors R1 and R2 are configured such that the power supplies thereto are stopped with a transistor switch, and the power is supplied to the comparator COM and the resistors R1 and R2 by turning the transistor switch ON for a period of a few seconds, and the overvoltage detection is performed, thereby reducing the current consumed according to the detection operation.

Moreover, in that case, a latch circuit may preferably be provided at an output of the comparator in order to maintain the output signal of the comparator during the sampling period.

When the limiter current ILIM flows into the AC generator AG, an electromagnetic brake is applied to a rotation of the rotor 14 thereof. Accordingly, because a load is applied to the rotor 14 even if the wristwatch is moved violently, the number of rotations decreases, and thus the terminal voltages V1 and V2 are lowered. In other words, this charging circuit 100 has a self-control characteristic such that the limiter current ILIM is reduced by forming a path for shunting.

In the meantime, as a method of preventing overcharging, it may be considered that the limiter transistor LIMTr is provided between the rectification unit 10 and the large-capacity capacitor 20, and the rectification unit 10 and the large-capacity capacitor 20 are disconnected by turning the limiter transistor LIMTr OFF when the charging voltage Va exceeds a predetermined voltage. However, with such a configuration, large generator voltages are generated at the input terminals AG1 and AG2, and thus it is necessary to make the breakdown voltage of the limiter transistor LIMTr large, but for a charging circuit of small portable equipment such as a wristwatch, it is made as an IC (Integrated Circuit) using a transistor with a small breakdown voltage, thus the limiter transistor LMITr with a large breakdown voltage is not suitable for making an IC. Regarding this point, in the present embodiment, it is arranged that the input terminals AG1 and AG2 are shunted when the charging voltage Va exceeds the predetermined voltage, and as the limiter transistor LIMTr, one with a low breakdown voltage can be used. Thus it has the advantage of being easily made as an IC.

As described above, according to the first embodiment, since the rectification unit 10 is configured without using a comparator, the circuit scale can be made small, and also the current consumed can be reduced.

Further, since the shunt unit 40 is configured using a transmission gate, and is controlled so that the transmission gate is turned ON when the charging voltage Va' that is divided from the charging voltage Va exceeds the reference voltage Vref, the charging voltage Va will never exceed the breakdown voltage of the large-capacity capacitor 20, thereby enabling the prevention of overcharging of the large-capacity capacitor 20.

In this case, since the shunt unit 40 is arranged to flow the generator current through a path that will not go through the diodes D1 and D2, but not by disconnecting the rectification unit 10 and the large-capacity capacitor 20, a transistor with a low breakdown voltage can be used for the one that is utilized in the shunt unit 40, thereby it is easily made as an IC. Further, when shunting the input terminals AG1 and AG2, a short brake is applied, so that the amplitudes of the terminal voltages V1 and V2 can be automatically lowered.

B. SECOND EMBODIMENT

In the above described first embodiment, since a source potential of the limiter transistor LIMTr rises above a body potential by an amount of the voltage drop Vf of the diodes D1 and D2 at the time of electricity generation, the threshold voltage Vt of the limiter transistor is reduced due to a backgate effect. For example, FIG. 16 shows the $I_{DS}$-$V_{GS}$ characteristics of an enhancement-type P-channel FET, which is commonly used. From this figure, it is apparent that the $I_{DS}$ vs. $V_{GS}$ characteristic varies when the body potential Vsub is reduced for the source potential Vs, and thus the threshold voltage Vt (absolute value between the gate and the source) is lowered. Accordingly, the charging voltage Va does not reach a predetermined voltage, and thus there is a case in which a small limiter current ILIM flows, as a resistance value between the source and the gate of the limiter transistor LIMTr is decreased during a period of time in which the limiter transistor LIMTr should be primarily OFF. In particular, it will be a problem when the generator current is large and the voltage drop Vf becomes large. Further, in the IC for use in a watch, since the threshold voltage Vt of the MOSFET is set to a low voltage such as 0.5 V, the influence of the backgate effect is substantial.

In view of such points, the second embodiment is made, and when the charging voltage Va does not reach the reference voltage Vref, a shunt path of the input terminals AG1 and AG2 is securely opened.

1. Configuration of Second Embodiment

FIG. 6 is a circuit diagram of a charging circuit that is used in a wristwatch according to the second embodiment. The charging circuit 101 is configured similarly to the charging circuit 100 of the first embodiment shown in FIG. 2, except for the points that instead of the rectification unit 10 of the first embodiment, a rectification unit 10' in which the low-potential power supply line VSS and the high-potential power supply line VDD are reversed is used, and a shunt unit 40' is used. Further, the configurations of the AC generator AG and the peripheral mechanism thereof are similar to the ones of the first embodiment shown in FIG. 3.

At first, in the rectification unit 10', the input terminals AG1 and AG2 are connected to the low-potential power supply line VSS through the diodes D1 and D2. Further, enhancement-type P-channel FETs P1 and P2 are provided between the input terminals AG1 and AG2 and the high-potential power supply line VDD. On one hand, a gate of the P-channel FET P1 is connected to the input terminal AG2, and on the other hand, a gate of the P-channel FET P2 is connected to the input terminal AG1.

Accordingly, when the voltage at the input terminal AG1 is lower than the voltage at the input terminal AG2, and when the voltage Vgs between the gate and the source of the P-channel FET P2 exceeds a certain value, the P-channel FET P2 turns ON. Further, when the voltage at the input terminal AG1 is below the voltage value of the low-potential power supply line VSS by an amount of the voltage drop Vf of the diode D1 as it is reduced, the diode D1 turns ON. Then, the charging current flows through the path: "the input terminal AG2→the P-channel FET P2→the high-potential power supply line VDD→the large-capacity capacitor 20→the diode D1→the input terminal AG1", and the electric charge charges the large-capacity capacitor 20.

Then, the shunt unit 40' is comprised of an enhancement-type P-channel limiter transistor LIMTr and diodes D3 and D4. It is arranged that a source and a body of the limiter transistor LIMTr are connected to the high-potential power supply line VDD, and a drain thereof is connected to anodes of each of the diodes D3 and D4, and further a control signal CS is supplied to the gate thereof. Moreover, the cathodes of the diodes D3 and D4 are connected to the input terminals AG1 and AG2, respectively. Herein, since a potential at the body of the limiter transistor LIMTr becomes equal to the one at the source thereof, no problems occur such as a resistance value OFF being reduced by a backgate effect. Accordingly, the shunt unit 40' enables efficient charging since no limiter current ILIM is flown when performing charging for the large-capacity capacitor 20.

In the shunt unit 40' of the present embodiment, since the diodes D3 and D4 are provided, no immediate limiter current ILIM flows even when the limiter transistor LIMTr is turned ON, but it is required to fulfill the conditions given by the following equations 1 and 2. Wherein, the voltage between the drain and source of the limiter transistor LIMTr is Vds', and the voltage drops of the diodes D3 and D4 are Vf.

$$V2 < Va - Vds' - Vf \qquad \text{equation (1)}$$

$$V1 < Va - Vds' - Vf \qquad \text{equation (2)}$$

2. Operation of Second Embodiment

In the following, an operation of a wristwatch according to the second embodiment will be described with reference to the drawings.

2-1: Charging Operation

FIG. 7 is a timing chart showing a charging operation of the charging circuit. Vt in the figure denotes the threshold voltages of the P-channel FETs P1 and P2.

As shown in the figure, when the terminal voltage V1 is below the threshold voltage Vt at time T1, the P-channel FET P2 turns ON. Thereafter, the terminal voltage V1 falls, and will be below the low-potential power supply line VSS at time T2, and when it further falls by an amount of the voltage drop Vf of the diode D1 (at time T3), then the diode D1 turns ON. At this moment, since the terminal voltage V2 exceeds the threshold voltage Vt, the P-channel FET P1 turns OFF. Accordingly, during the period of time Ta (T3 to T4) while the diode D1 is ON, the charging current i flows through the path: "the input terminal AG2→the P-channel FET P2→the high-potential power supply line VDD→the large-capacity capacitor 20→the low-potential power supply line VSS→the diode D1", and the electric charge charges the large-capacity capacitor 20.

Thereafter, on the other hand, the terminal voltage V2 falls when the terminal voltage V1 rises, and the terminal voltage V2 is below the threshold voltage Vt at time T5. Then, the P-channel FET P1 turns ON. Thereafter, the terminal voltage V2 falls, and is below the low-potential power supply line VSS at time T6, and further when it falls by an amount of the voltage drop Vf of the diode D2 (at time T7), the diode D2 turns ON. At this moment, since the terminal voltage V1 exceeds the threshold voltage Vt, the P-channel FET P2 turns OFF. Accordingly, during the period of time Tb (T7 to T8) while the diode D2 is ON, the charging current flows through the path: "the input terminal AG1→the P-channel FET P1→the high-potential power supply line VDD→the large-capacity capacitor 20→the low-potential power supply line VSS→the diode D2", and the electric charge charges the large-capacity capacitor 20. As a result, the generator voltage is full-wave rectified, and thus the charging current shown in FIG. 4(c) is obtained.

2-2: Overcharge Prevention Operation

In the following, an overcharge prevention operation will be described with reference to FIG. 6. Since the charging current i flows into the large-capacity capacitor 20 when the above-described charging is performed, the charging voltage Va thereof rises gradually. The comparator COM in the comparison unit 30 compares the voltage Va' (=Va·R2/(R1+R2)), of which the charging voltage Va is divided by the resistors R1 and R2, with the reference voltage Vref, and sets the control signal CS to the low level when the former exceeds the latter. As a result, the limiter transistor LIMTr switches from OFF to ON.

Herein, the P-channel FET P1 turns ON when the terminal voltage V2 falls, and becomes lower than the threshold voltage Vt, and further when the terminal voltage V2 fulfills the condition of the above described equation 2, the limiter current ILIM flows through the path indicated by an arrow X1 in the figure. On the other hand, when the terminal voltage V1 falls, and the P-channel FET P2 turns ON, and further when the terminal voltage V1 fulfills the condition of the above described equation 1, the limiter current ILIM flows through the path indicated by an arrow X2 in the figure.

As a result, the input terminals AG1 and AG2 are shunted, and no charging current flows into the large-capacity capacitor 20 even when the terminal voltages V1 and V2 exceed the charging voltage Va, thereby making it possible to avoid overcharging of the large-capacity capacitor 20. Further, in the present embodiment, similarly to the first embodiment, when the limiter current ILIM flows into the AC generator AG, an electromagnetic brake is applied to the rotor 14, and thus the charging circuit 101 has a self-control characteristic.

3. Advantage of Second Embodiment

As described above, according to the second embodiment, since the source and body of the limiter transistor LIMTr are connected to the high-potential power supply line VDD, there is no possibility that the body potential exceeds the source potential, and thus no limiter current ILIM flows during normal operation due to the backgate effect. As a result, the charging efficiency can be further enhanced.

C. THIRD EMBODIMENT

1. Configuration of Third Embodiment

FIG. 8 is a circuit diagram of the charging circuit that is used in a wristwatch according to the third embodiment of the present invention.

In FIG. 8, the same reference numerals and symbols indicate the same elements and parts in FIG. 2.

The points in the charging circuit 100" of the present third embodiment that differ from the charging circuit 100 of the first embodiment are that, instead of the limiter transistor LIMTr which functions as the shunt unit 40, there are provided a limiter transistor LIMTr1 that is an enhancement-type N-channel FET, which is connected, in parallel with an N-channel FET N1, between the input terminal AG1 and the low-potential power supply line VSS, a gate terminal thereof being connected to an output terminal of the comparator COM; and a limiter transistor LIMTr2 that is an enhancement-type N-channel FET, which is connected, in parallel with an N-channel FET N2, between the input terminal AG2 and the low-potential power supply line VSS, a gate terminal thereof being connected to an output terminal of the comparator COM.

The limiter transistor LIMTr1 and the limiter transistor LIMTr2 have the same electrical characteristics, and in the present example, since they are configured with an N-channel, they turn OFF (open) when the control signal CS is at a low level, and they turn ON (connected) when the control signal CS is at a high level. Accordingly, when the charging voltage Va exceeds the predetermined voltage, the input terminals AG1 and AG2 are connected, and thus the limiter current ILIM flows, thereby no charging current i flows into the large-capacity capacitor 20.

2. Operation of Third Embodiment

An operation of the present third embodiment during charging is basically the same as in the first embodiment, and thus an operation of overcharge prevention will be described with reference to FIG. 8.

Since the charging current i flows into the large-capacity capacitor 20 when charging is performed, the charging voltage Va thereof rises gradually. The comparator COM in the comparison unit 30 compares the voltage Va' (which is Va·R2/(R1+R2)), of which the charging voltage Va is divided by the resistors R1 and R2, with the reference voltage Vref, and sets the control signal CS to the low-potential level when the former exceeds the latter.

Then, because the limiter transistor LIMTr1 and the limiter transistor LIMTr2 simultaneously switch from OFF to ON, the input terminals AG1 and AG2 are shunted, and the limiter current ILIM flows through the path as indicated by an arrow X' in the figure.

Further, overvoltage detection is a detection operation which may be performed by sampling even when the detection is not being constantly performed. More concretely, the comparator COM and the resistors R1 and R2 are configured such that the power supplies thereto are stopped with a transistor switch, and the power is supplied to the comparator COM and the resistors R1 and R2 by turning the transistor switch ON for a period of a few seconds, and the overvoltage detection is performed, thereby reducing the current consumed according to the detection operation.

Moreover, in that case, a latch circuit may preferably be provided at an output of the comparator in order to maintain an output signal of the comparator during the sampling period.

When the limiter current ILIM flows into the AC generator AG, an electromagnetic brake is applied to a rotation of the rotor 14 thereof. Accordingly, because a load is applied to the rotor 14 even if the wristwatch is moved violently, the number of rotations decreases, and thus the terminal voltages V1 and V2 are lowered. In other words, this charging circuit 100" has a self-control characteristic such that the limiter current ILIM is reduced by forming a path for shunting.

As described above, according to the third embodiment, since the rectification unit 10 is configured without using a comparator, the circuit scale can be made small, and also the current consumed can be reduced.

Further, since the shunt unit 40 is configured with the limiter transistor LIMTr1 and the limiter transistor LIMTr2 that are both N-channel FETs, and are controlled so that the limiter transistor LIMTr1 and the limiter transistor LIMTr2 are simultaneously turned ON when the charging voltage Va' that is divided from the charging voltage Va exceeds the reference voltage Vref, the charging voltage Va will never exceed the breakdown voltage of the large-capacity capacitor 20, thereby enabling the prevention of overcharging of the large-capacity capacitor 20.

In this case, since the shunt unit 40 is arranged to flow the generator current through a path that will not go through the diodes D1 and D2, but not by disconnecting the rectification unit 10 and the large-capacity capacitor 20, a transistor with a low breakdown voltage can be used for the one that is utilized in the shunt unit 40, thereby it is easily made as an IC. Further, when shunting the input terminals AG1 and AG2, a short brake is applied, so that the amplitudes of the terminal voltages V1 and V2 can be lowered automatically.

3. Advantage of Third Embodiment

As described above, according to the third embodiment, since the source and body of the limiter transistor LIMTr are connected to the high-potential power supply line VDD, there is no possibility that the body potential exceeds the source potential, and thus no limiter current ILIM flows during normal operation due the backgate effect. As a result, the charging efficiency can be further enhanced.

Furthermore, compared to the second embodiment, it is possible to omit the diodes D3 and D4 for use in limiters that are externally attached elements, thereby enabling the formation of the circuit within an integrated circuit.

D. FOURTH EMBODIMENT

1. Configuration of Fourth Embodiment

FIG. 9 is a circuit diagram of the charging circuit that is used in a wristwatch according to the fourth embodiment of the present invention.

In FIG. 9, the same reference numerals and symbols indicate the same elements and parts in FIG. 2.

The main part of the charging circuit 100" is comprised of a rectification unit for rectifying a generator voltage of an AC generator AG, a large-capacity capacitor 20 for storing a charging current, a comparison unit 30 for detecting a charging voltage Va of the large-capacity capacitor 20 and for comparing the charging voltage Va with a reference voltage Vref, and a shunt unit 40 for shunting the high-potential power supply line VDD and the low-potential power supply line VSS based on the detection result of the comparison unit 30, and a reversed-current-prevention diode DRP for preventing a reversed current. Further, d shown in the figure denotes a parasitic diode.

In the present case, detailed descriptions of the configurations for the rectification unit 10, the large-capacity capacitor 20 and the comparison unit 30 are omitted since they are the same for the ones in the first embodiment.

In the following, a configuration of the shunt unit 40 will be described.

The shunt unit 40 is comprised of a limiter transistor LIMTr. As the limiter transistor LIMTr, an enhancement-type P-channel transistor is used, and it is connected to the power supply lines VDD and VSS. In the present example, configured with a P-channel, it turns ON (connected) when the control signal CS is at a low level, and it turns OFF (open) when the control signal CS is at a high level. Accordingly, when the charging voltage Va exceeds the predetermined voltage, and the limiter current ILIM flows by shunting the high-potential power supply line VDD and the low-potential power supply line VSS, no charging current i flows into the large-capacity capacitor 20.

At this moment, the reversed-current-prevention diode DRP prevents the limiter current ILIM from flowing into the large-capacity capacitor 20 as the charging current i.

2. Operation of Fourth Embodiment

In the following, an operation of the wristwatch according to the fourth embodiment will be described with reference to FIG. 4.

2-1: Charging Operation

When the AC generator AG starts generating electricity, a generator voltage is supplied to both input terminals AG1 and AG2. In this case, the terminal voltage V1 at the input terminal AG1 and the terminal voltage V2 at the input terminal AG2 are such that the phases thereof are reversed, as shown in signals (a) and (b) of FIG. 4. Further, in the figures, Vt denotes the threshold voltages of the N-channel FET N1 and N2.

As shown in the figures, when the terminal voltage V1 exceeds the threshold voltage Vt at time T1, the N-channel FET N2 turns ON. Thereafter, the terminal voltage rises, and exceeds the potential of the high-potential power supply line VDD, and further, when it rises by an amount of the voltage drop Vf of the diode D1 (at time T3), the diode D1 turns ON. At this moment, since the terminal voltage V2 is below the threshold voltage Vt, the N-channel FET N1 is OFF. Accordingly, during the period of time Ta (T3 to T4) while the diode D1 is ON, the charging current i flows through the path: "the input terminal AG1→the diode D1→the high-potential power supply line VDD→the large-capacity capacitor 20→the reversed flow prevention diode DRP→the low-potential power supply line VSS→the N-channel FET N2", and the electric charge charges the large-capacity capacitor 20.

Thereafter, on the other hand, the terminal voltage V2 rises when the terminal voltage V1 falls, and the terminal voltage V2 exceeds the threshold voltage Vt at time T5. Then, the N-channel FET N1 turns ON. Thereafter, the terminal voltage V2 rises, and exceeds the high-potential power supply line VDD at time T6, and further when it rises by an amount of the voltage drop Vf of the diode D2 (at time T7), the diode D2 turns ON. At this moment, since the terminal voltage V1 is below the threshold voltage Vt, the N-channel FET N2 is OFF. Accordingly, during the period of time Tb (T7 to T8) while the diode D2 is ON, the charging current i flows through the path: "the input terminal AG2→the diode D2→the high-potential power supply line VDD→the large-capacity capacitor 20→the low-potential power supply line VSS→the reversed-current-prevention diode DRP→the N-channel FET N1", and the electric charge charges the large-capacity capacitor 20. As a result, the generator voltage is full-wave rectified, and thus the charging current i shown in FIG. 4(c) is obtained.

2-2: Overcharge Prevention Operation

In the following, an overcharge prevention operation will be described with reference to the process flowcharts in FIGS. 2 and 5.

Since the charging current i flows into the large-capacity capacitor 20 when the above-described charging is performed, the charging voltage Va thereof rises gradually. The comparator COM in the comparison unit 30 compares the voltage Va' (which is Va·R2/(R1+R2)), of which the charging voltage Va is divided by the resistors R1 and R2, with the reference voltage Vref (step S1), and sets the control signal CS to the low level when the former exceeds the latter.

As a result, since the limiter transistor LIMTr switches from OFF to ON (step S2), the high-potential power supply line VDD and the low-potential power supply line VSS are shunted, and, for example, when the terminal voltage AG1 (V1) rises and the terminal voltage AG2 (V2) falls, the limiter current ILIM flows through the path indicated by an arrow X in the figure.

When the limiter current ILIM flows into the AC generator AG, an electromagnetic brake is applied to a rotation of the rotor 14 thereof. Accordingly, because a load is applied to the rotor 14 even if the wristwatch is moved violently, the number of rotations decreases, and thus the terminal voltages V1 and V2 are lowered. In other words, this charging circuit 100 has a self-control characteristic such that the limiter current ILIM is reduced by forming a path for shunting.

As described above, according to the fourth embodiment, since the rectification unit 10 is configured without using a comparator, the circuit scale can be made small, and also the current consumed can be reduced.

Further, since the shunt unit 40 is configured with a field effect transistor, and is arranged to be controlled such that the limiter transistor turns ON when the voltage Va', of which the charging voltage Va is divided, exceeds the reference voltage Vref, the charging voltage Va will never exceed the breakdown voltage of the large-capacity capacitor 20, thereby enabling the prevention of overcharging of the large-capacity capacitor 20.

E. FIFTH EMBODIMENT

1. Configuration of Fifth Embodiment

FIG. 18 is a circuit diagram of a voltage-detection determination unit 30A' that is another embodiment of the voltage-detection determination unit 30A of the first embodiment, and as it would be understood by one versed in the art, may be used in place of the comparsion unit 30, which is the previously shown implementation of the voltage-detection unit 30A, used in the exemplary embodiments of FIGS. 2, 6, and 8–12. In FIG. 18, the same symbols and references are attached to the parts or elements that are the same as the first embodiment in FIG. 1.

A voltage-detection determination unit 30A is comprised of a constant current source CCNST in which one end thereof is connected to a power supply VDD, a transistor Q1 in which a drain D and a gate G thereof are commonly connected to the other end of the constant current source CCNST, a transistor Q2 in which a drain D and a gate G thereof are commonly connected to a source S of the transistor Q1, a pull-down resistor RPD in which one end thereof is connected to the power supply VDD, a first inverter INV1 in which an input terminal thereof is connected to the other end of the pull-down resistor RPD, a second inverter INV2 in which an input terminal thereof is connected to an output terminal of the first inverter INV1 and for outputting a control signal CS, and a current mirror circuit CMC that is connected between a source S of the transistor Q2 and the other end of the pull-down resistor RPD as well as to a power supply VSS.

The current mirror circuit CMC is comprised of a transistor QD in which a drain D and a gate G thereof are commonly connected to a source S of the transistor Q2, and a transistor QC in which a drain D thereof is connected to the other end of the pull-down resistor RPD, a gate G thereof is connected to the gate G of the transistor QD, and a source S thereof is connected to the power supply VSS.

2. Operation of Fifth Embodiment

In the following, an operation of the voltage-detection determination unit 30A of the fifth embodiment will be described with reference to FIGS. 1 and 18.

While the power supply voltage (VDD–VSS) is low, that is, in FIG. 18, when it is less than the total voltage of the threshold voltages of the transistor Q1, the transistor Q2, and the transistor QD, no current flows from the constant current source CCNST, the transistor QD and the transistor QC in the current mirror circuit CMC are OFF, and the voltage V1 (=equivalent to an "H" level) to which the power supply VDD is pulled-down by the pull-down resistor RPD is supplied to the input terminal of the first inverter INV1, and the first inverter INV1 outputs a signal with an "L" level.

As a result, since the second inverter INV 2 makes the control signal CS to be at the "H" level, the limiter transistor 40 maintains OFF.

On the other hand, when the power supply (VDD–VSS) becomes large, and exceeds the predetermined voltage (in FIG. 18, the total voltage of the threshold voltages of the transistor Q1, the transistor Q2, and the transistor QD), a current flows from the constant current source CCNST to the power supply VSS side through the transistors Q1, Q2, and QD, and a current having a size which is equivalent to the current between the drain D and the source S of the transistor QD flows between the drain D and the source S of the transistor QC.

Herein, the current that flows through the transistor QC is set to be larger than a current that may flow through the pull-down resistor RPD, and, as a result, the voltage V1 becomes a voltage which is equivalent to the "L" level.

As a result, since the first inverter INV1 outputs a signal at the "H" level, and the second inverter INV2 makes the control signal CS to be at the "L" level, the limiter transistor 40 turns ON, and thus the limiter current flows.

As describe above, the voltage-detection determination unit 30A' in the fifth embodiment does not substantially consumes current when the power source voltage is low, thus it is suitable for a circuit which prevents an overvoltage in portable electronic equipment that is driven by a battery and the like.

E. MODIFICATIONS

The present invention is not limited to the above described embodiments, and for example, various kinds of modifications to be described below are possible.

(1) The charging circuit 100 of the first embodiment as described above may be comprised as the charging circuit 100' by reversing the high-potential power supply line VDD and the low-potential power supply line VSS. A configuration of the charging circuit 100' is shown in FIG. 10. In this case, the charging circuit 100' is the same as the charging circuit 100 in the first embodiment except for the point that instead of the rectification unit 10 the rectification unit 10' illustrated in the second embodiment is used.

(2) The charging circuit 101 in the second embodiment as described above may be comprised as the charging circuit 101' by reversing the high-potential power supply line VDD and the low-potential power supply line VSS. In this case, when simply applying the rectification unit 10 illustrated in the first embodiment instead of the rectification unit 10', it becomes a circuit as shown in FIG. 11. Herein, a limiter current ILIM flows through the path indicated by an arrow Y when the terminal voltage V1 becomes larger than the terminal voltage V2. However, since the N-channel FET N2 turns ON as the terminal voltage V1 rises, there is a problem in that the large-capacity capacitor 20 is shunted and a shunt current flows through the path indicated by an arrow Z.

Thus, the charging circuit 101' needs to be configured as shown in FIG. 12. This charging circuit 101' is the same as the charging circuit 101 of the second embodiment except for the points that it uses the rectification unit 10 illustrated in the first embodiment instead of the rectification unit 10', and uses an enhancement-type N-channel FET as the limiter transistor LIMTr, and a positive input terminal and a negative input terminal of the comparator COM are reversed. That is, it not required to allow limiter current obtained by shunting the generator current to flow through the diodes D1 and D2 for use in rectification.

In this case, since the comparator COM makes the control signal CS to be at a high level when the voltage Va', of which the charging voltage Va is divided, exceeds the reference voltage Vref, the limiter transistor LIMTr turns ON. Herein, when the terminal voltage V1 rises, the limiter current ILIM flows through the path indicated by an arrow Y' in the figure, thus overcharging of the large-capacity capacitor 20 is prevented. Now, an overcharge prevention operation of the charging circuit 101' will be described with reference to the timing chart shown in FIG. 17. In the figure, since the limiter transistor LIMTr is OFF during the period of time when the control signal CS is at the low level (up to T10 and from T20 on words), the rectification unit 10 performs a normal rectification operation similar to FIG. 4, and the charging current i shown in signal (d) of FIG. 17 flows into the large-capacity capacitor 20. Now, when the control signal CS becomes a high level, as shown in signal (a) of FIG. 17, the limiter transistor turns ON. In this case, when the terminal voltage V1 at the input terminal AG1 rises by an amount of the sum of the voltage drop Vf of the diode D3 and the voltage Vds between the drain and the source of the limiter transistor LIMTr, as shown in signal (b) of FIG. 17, the diode D3 turns ON. Then, the limiter current ILIM shown in signal (e) of FIG. 17 flows through the path: "the input terminal AG1→the diode D3→the limiter transistor LIMTr→the low-potential power supply line VSS→the N-channel FET N2→the input terminal AG2". On the other hand, when the terminal voltage V2 at the input terminal AG2 rises, as shown in signal (c) of FIG. 17, the diode D4 turns ON, and the limiter current ILIM flows through the path: "the input terminal AG2→the diode D4→the limiter transistor LIMTr→the low-potential power supply line VSS→the N-channel FET N1→the input terminal AG1". Accordingly, since the diodes D3 and D4 turn ON before the diodes D1 and D2 turn ON, even when the terminal voltages V1 and V2 rise, no charging current i flows into the large-capacity capacitor 20, thereby enabling the prevention of overcharging.

(3) In each of the embodiments and modifications described above, they are described considering a wristwatch as an example of electronic equipment that uses the charging circuits 100 and 101, but the present invention is not limited to this, and can be applied to, for example, a table clock, other types of timepiece, a portable blood-pressure meter, a portable telephone, a pager, a pedometer, a pocket calculator, a notebook-type personal computer, an electronic pocket notebook, a portable radio, and the like. In summary, it may be applied to anything that is electronic equipment that consumes electrical power. In the electronic equipment such that as described above, since an electronic circuit and a mechanical system that are installed therein are continuously operable even if there is no battery, the electronic equipment can be used anytime, and further it is no longer required to perform battery replacement, which may be cumbersome. Moreover, there is no problem associated with discarding a battery.

Further, a non-chargeable battery and the charging circuits 100 and 101 may be used together, and in this case, when the electronic equipment is not carried for a long period of time, the electronic equipment can be operated immediately by electrical power from the battery, and thereafter, as a user carries the electronic equipment, the electronic equipment can be operated by generated electrical power.

(4) In each of the embodiments and modifications described above, as examples of the switching means, although unipolar transistors, such as the P-channel FETs P1 and P2 and the N-channel FETs N1 and N2 are illustrated, PNP-type transistors may be used in place of the P-channel FETs P1 and P2 and NPN-type bipolar transistors may be used in place of the N-channel FETs N1 and N2. However, in these bipolar transistors, since the saturation voltage between the emitter and the collector thereof is normally about 0.3 V, when the electromotive voltage of the AC generator AG is small, it is desirable to use the FET as in the above described embodiments.

(5) In each of the embodiments and modifications described above, the comparator COM may be configured using the FET, and all of the charging circuits 100 and 101 may be installed in one chip of an IC. Further, the diodes D1 to D4 may be anything, and as long as they are one directional elements that allow a current to flow in one direction, no specific type is considered. For example, besides a germanium diode, a Schottky diode may be used. In particular, because a drop voltage is as small as 0.3 V for the Schottky diode, it is suitable when the electromotive voltage is small.

(6) The charging circuits 100 and 101 according to each of the embodiments as described above and the charging circuits 100' and 101' according to the modifications may be applied in an electronic-controlled mechanical watch provided with a windup-type generator. FIG. 13 is a perspective view showing a mechanical structure of an electronic-controlled mechanical watch. In this wristwatch, it is arranged that the spring 110 is coupled with a crown (not shown), and by winding the crown, mechanical energy is stored in the spring 110. A speed-increasing wheel array 120 is provided between the spring 110 and a rotor 131 of a generator 130. The speed-increasing wheel array 120 is comprised of a second wheel 121 to which a minute hand 124 is fixed, a third wheel 122, and a fourth wheel 123 to which a second hand 125 is fixed, and the like. Then, it is arranged that a movement of the spring 110 is transmitted to the rotor 131 of the generator 130 by this speed-increasing wheel array 120, and thus the generation of electricity is performed. Herein, the generator 130 also functions as an electromagnetic brake, and rotates the indicators that are fixed to the speed-increasing wheel array 120. In this regard, the generator 130 also functions as a regulator.

FIG. 14 is a block diagram showing an electrical configuration of the electronic-controlled mechanical watch to which the charging circuit 100 of the first embodiment is applied. In the figure, the charging circuit 100 is comprised of the generator 130 and a rectifying circuit 140. An oscillation circuit 160 generates a clock signal CLK by using a crystal oscillator 161. In a speed-governor circuit 170, when a detection circuit 102 detects a generator frequency of the generator 130, a control circuit 103 controls, based on the result of this detection, a shunt unit 40 to make a rotational speed of the rotor 131 constant by regulating the electromagnetic brake such that a rotational frequency of the rotor 131 matches the frequency of the clock signal CLK.

Herein, rotational control of the generator 130 is performed by switching ON/OFF the shunt unit 40 with which it enables both of the coil ends of the AC generator AG to be shunted. This switching is analogous to the limiter transistor LIMTr in the above described embodiments. When the switch is turned ON, with this chopping, a short brake is applied to the AC generator AG and electrical energy is stored in the coil of the AC generator AG. On the other hand, when the switch is turned OFF, the AC generator AG is operated, and the electrical energy stored in the coil is discharged and an electromotive voltage is generated. Since electrical energy at a time when the switch is turned OFF is added to the electromotive voltage at this moment, the value thereof can be raised. Accordingly, when the AC generator AG is controlled with the chopping, a drop of the generator power during breaking can be compensated for by an amount of the raise in the electromotive voltage at a time of switching OFF, and a retarding torque can be increased while keeping the generator power constant, thereby enabling the configuration of an electronic-controlled mechanical watch with a long operating time. In this case, the switch for use in chopping and the limiter transistor LIMTr for use in overcharge prevention can be used together, thus enabling the configuration to be made simple.

(7) Further, a comparison operation in the comparison unit 30 in each of the embodiments and the modifications described above is one that has always been performed, but the present invention is not limited to this, the comparison operation may be performed with a sampling frequency, or the comparison operation may be performed while the AC generator AG is in the generation state by detecting the generation state of the AC generator AG.

INDUSTRIAL APPLICABILITY

According to the present invention as described above, it is arranged that when the charging voltage exceeds a predetermined voltage, a generator current that is output from one of the input terminals is supplied to the other one of the input terminals through a path that does not pass through the first and second diodes, thus overcharging of the charging element can be prevented. Further, since no comparator is used for controlling the switching means, the circuit scale can be made small, and a low consumption power can be further reduced.

Further, when using the transmission gate, both input terminals are shunted by this gate, and thus overcharging of the charging element can be prevented with a simple configuration. As a result, the manufacturing cost can be reduced, and further, it facilitates the integration of the charging circuit into electronic equipment such as a wristwatch, in which the requirement of saving space is severe.

Moreover, when a shunt path is formed through an N-channel field effect transistor or a P-channel field effect transistor and a diode, an off-resistance is not lowered by a backgate effect, and thus there is an advantage that charging efficiency is not lowered as a limiter current flows when the charging voltage is less than the predetermined voltage, thereby enabling the charging circuit to securely function.

What is claimed is:

1. An overcharge prevention method, which is adapted to be used in a charging circuit for charging a charging element, using a rectifying circuit comprised of a plurality of rectifying elements, which converts an alternating current input from an alternating-current power supply through a plurality of input terminals to direct current and outputs the direct current, the method comprising the steps of:

detecting a charging voltage of the charging element; and shunting said plurality of input terminals so as to bypass all of said plurality of rectifying elements when the detected charging voltage exceeds a predetermined voltage.

2. An overcharge prevention method, which is adapted to be used in a charging circuit for charging a charging element, using a rectifying circuit comprised of a plurality of rectifying elements, which converts an alternating current input from an alternating-current power supply through a plurality of input terminals to a direct current and outputs said direct current, the method comprising the steps of:

detecting a charging voltage of the charging element;

comparing the detected charging voltage with a predetermined voltage; and shunting said plurality of input terminals so as to bypass all of said plurality of rectifying elements when said detected charging voltage exceeds the predetermined voltage.

3. An overcharge prevention method which is used in a charging circuit, said charging circuit including a charging element and a rectifying circuit, said rectifying circuit including first and second switching elements and first and second diodes, each of said first and second switching elements being controlled in accordance with a terminal voltage at respective first and second input terminals to which an alternating-current voltage is supplied to selectively couple said input terminals to a first power supply line, said first and second diodes being in respective electrical communication between said first and second input terminals and a second power supply line, said rectifying circuit being effective for rectifying said alternating-current voltage and for charging electrical power into said charging element, said method comprising the steps of:

detecting a charging voltage of the charging element;

comparing the detected charging voltage with a predetermined voltage; and providing a third switching element across said first and second input terminals to selectively shunt said input terminals.

4. An overcharge prevention method according to claim 3, wherein said third switching element bypasses said first and second diodes by shunting both of said input terminals when the detected charging voltage exceeds said predetermined voltage.

5. A charging circuit for charging electrical power into a charging element using a rectifying circuit comprised of a plurality of rectifying elements, which converts an alternating current input from an alternating current power supply through a plurality of input terminals to a direct current and outputs the direct current, said charging circuit comprising:

a charging voltage detector to detect a charging voltage of the charging element; and a shunt to shunt the plurality of input terminals to bypass all of said plurality of rectifying elements when the detected charging voltage exceeds a predetermined voltage.

6. A charging circuit for charging electrical power into a charging element using a rectifying circuit comprised of a plurality of rectifying elements, which converts an alternating current input from an alternating current power supply through a plurality of input terminals to a direct current and outputs the direct current, said charging circuit comprising:

a charging voltage detector to detect a charging voltage of the charging element;

a comparator to compare the detected charging voltage with a predetermined voltage; and a shunt to shunt the plurality of input terminals to bypass all of said plurality of rectifying elements when the detected charging voltage exceeds the predetermined voltage.

7. A charging circuit for rectifying an alternating-current voltage supplied to first and second input terminals and for charging a charging element that is provided between first and second power supply lines, comprising:

a first switch provided between the first input terminal and the first power supply line, having an ON state and an OFF state controlled on a basis of a voltage at the second input terminal;

a second switch provided between the second input terminal and the first power supply line, having an ON state and an OFF state controlled on a basis of a voltage at the first input terminal;

a first diode provided between the first input terminal and the second power supply line;

a second diode provided between the second input terminal and the second power supply line;

a comparator to detect a charging voltage of the charging element, and to compare the detected charging voltage with a predetermined voltage; and a shunt including a third switch across said first and second input terminals to shunt the first input terminal and the second input terminal.

8. A charging circuit according to claim 7, wherein said third switch provided between the first input terminal and the second input terminal bypasses said first and second diodes when the detected charging voltage exceeds said predetermined voltage.

9. A charging circuit according to claim 7, wherein for rectifying an alternating-current voltage supplied to first and second input terminals and for charging a charging element that is provided between first and second power supply lines, comprising:

a first switch provided between the first input terminal and the first power supply line, having an ON state and an OFF state controlled on a basis of a voltage at the second input terminal;

a second switch provided between the second input terminal and the first power supply line, having an ON state and an OFF state controlled on a basis of a voltage at the first input terminal;

a first diode provided between the first input terminal and the second power supply line;

a second diode provided between the second input terminal and the second power supply line;

a comparator to detect a charging voltage of the charging element, and to compare the detected charging voltage with a predetermined voltage; and a shunt to shunt the first input terminal and the second input terminal by supplying a current that flows from one of the first and second input terminals to the other one of the first and second input terminals through a path that bypasses said first and second diodes, based on a comparison result of said comparator; said shunt comprises:

a third diode in which one end thereof is in electrical communication with the first input terminal;

a fourth diode in which one end thereof is in electrical communication with the second input terminal; and a transistor which is in electrical communication with the other ends of said third and fourth diodes and is also in electrical communication with the first and second power supply lines.

10. A charging circuit for rectifying an alternating-current voltage supplied to first and second input terminals and for charging a charging element that is provided between a high-potential power supply line and a low-potential power supply line, comprising:

a first diode in which an anode thereof is in electrical communication with the first input terminal, and a cathode thereof is in electrical communication with the high-potential power supply line;

a second diode in which an anode thereof is in electrical communication with the second input terminal, and a cathode thereof is in electrical communication with the high-potential power supply line;

a first N-channel field effect transistor in which a drain thereof is in electrical communication with the first input terminal, a source thereof is in electrical communication with the low-potential power supply line, and a gate thereof is in electrical communication with the second input terminal;

a second N-channel field effect transistor in which a drain thereof is in electrical communication with the second input terminal, a source thereof is in electrical communication with the low-potential power supply line, and a gate thereof is in electrical communication with the first input terminal;

a comparator to compare a charging voltage of the charging element with a predetermined voltage; and a transmission gate provided between the first and second input terminals having an ON state and an OFF state controlled on a basis of a comparison result of said comparator and upon being switched ON, said transmission gate bypasses at least one of a first group including said first and second diodes and a second group including said first and second transistors.

11. A charging circuit for rectifying an alternating-current voltage supplied to first and second input terminals and for charging a charging element that is provided between a high-potential power supply line and a low-potential power supply line, comprising:

a first diode in which a cathode thereof is in electrical communication with the first input terminal, and an anode thereof is in electrical communication with the low-potential power supply line;

a second diode in which a cathode thereof is in electrical communication with the second input terminal, and an anode thereof is in electrical communication with the low-potential power supply line;

a first P-channel field effect transistor in which a drain thereof is in electrical communication with the first input terminal, a source thereof is in electrical communication with the high-potential power supply line, and a gate thereof is in electrical communication with the second input terminal;

a second P-channel field effect transistor in which a drain thereof is in electrical communication with the second input terminal, a source thereof is in electrical communication with the high-potential power supply line, and a gate thereof is in electrical communication with the first input terminal;

a comparator to compare a charging voltage of said charging element with a predetermined voltage; and a transmission gate provided between the first and second input terminals having an ON state and an OFF state controlled on a basis of a comparison result of said comparator and upon being switched ON, said transmission gate bypasses at least one of a first group including said first and second diodes and a second a group including said first and second transistors.

12. A charging circuit for rectifying an alternating-current voltage supplied to first and second input terminals and for charging a charging element that is provided between a high-potential power supply line and a low-potential power supply line, comprising:

a first diode in which an anode thereof is in electrical communication with the first input terminal, and a cathode thereof is in electrical communication with the high-potential power supply line;

a second diode in which an anode thereof is in electrical communication with the second input terminal, and a cathode thereof is in electrical communication with the high-potential power supply line;

a first N-channel field effect transistor in which a drain thereof is in electrical communication with the first input terminal, a source thereof is in electrical communication with the low-potential power supply line, and a gate thereof is in electrical communication with the second input terminal;

a second N-channel field effect transistor in which a drain thereof is in electrical communication with the second input terminal, a source thereof is in electrical communication with the low-potential power supply line, and a gate thereof is in electrical communication with the first input terminal;

a comparator to compare a charging voltage of said charging element with a predetermined voltage;

a third diode in which an anode thereof is in electrical communication with the first input terminal;

a fourth diode in which an anode thereof is in electrical communication with the second input terminal; and a third N-channel field effect transistor in which a drain thereof is in electrical communication with cathodes of said third and fourth diodes, a source thereof is in electrical communication with the low-potential power supply line, and a comparison result of said comparator is supplied to a gate thereof.

13. A charging circuit for rectifying an alternating-current voltage supplied to first and second input terminals and for charging a charging element that is provided between a high-potential power supply line and a low-potential power supply line, comprising:

a first diode in which a cathode thereof is in electrical communication with the first input terminal, and an anode thereof is in electrical communication with the low-potential power supply line;

a second diode in which a cathode thereof is in electrical communication with the second input terminal, and an anode thereof is in electrical communication with the low-potential power supply line;

a first P-channel field effect transistor in which a drain thereof is in electrical communication with the first input terminal, a source thereof is in electrical communication with the high-potential power supply line, and a gate thereof is in electrical communication with the second input terminal;

a second P-channel field effect transistor in which a drain thereof is in electrical communication with of the second input terminal, a source thereof is in electrical communication with of the high-potential power supply line, and a gate thereof is in electrical communication with of the first input terminal;

a comparator to compare a charging voltage of said charging element with a predetermined voltage;

a third diode in which a cathode thereof is in electrical communication with the first input terminal;

a fourth diode in which a cathode thereof is in electrical communication with the second input terminal; and a third P-channel field effect transistor in which a drain thereof is in electrical communication with anodes of said third and fourth diodes, a source thereof is in electrical communication with the high-potential power supply line, and a comparison result of said comparator is supplied to a gate thereof.

14. An electronic equipment comprising:

a charging circuit having a rectifying circuit comprised of a plurality of rectifying elements, which converts an alternating current input from an alternating current power supply through a plurality of input terminals to a direct current and outputs the direct current, said charging circuit comprising:

a charging voltage detector to detect a charging voltage of the charging element; and a shunt to shunt together said plurality of input terminals and bypass all of said plurality of rectifying elements when the detected charging voltage exceeds a predetermined voltage, wherein said electronic equipment operates in accordance with electrical power that is supplied from said charging circuit.

15. A timepiece comprising:

a charging circuit having a rectifying circuit comprised of a plurality of rectifying elements, which converts an alternating current input from an alternating current power supply through a plurality of input terminals to a direct current and outputs the direct current, said charging circuit comprising:

a charging voltage detector to detect a charging voltage of the charging element; and a shunt to shunt together said plurality of input terminals and bypass all of said plurality of rectifying elements when the detected charging voltage exceeds a predetermined voltage; and a timepiece circuit that measures time supplied with electrical power from said charging circuit.

16. An electronic equipment comprising:

a charging circuit for charging electrical power into a charging element, using a rectifying circuit having a plurality of rectifying elements, which converts an alternating current input from an alternating current power supply through first and second input terminals to a direct current and outputs the direct current, said charging circuit comprising:

a charging voltage detector to detect a charging voltage of the charging element;

a comparator to compare the detected charging voltage with a predetermined voltage; and a shunt to shunt said input terminals and bypass said plurality of rectifying elements when the detected charging voltage exceeds the predetermined reference voltage; wherein said plurality of rectifying elements include:

i) a first switch provided between the first input terminal and the first power supply line, having an ON state and an OFF state controlled on a basis of a voltage at the second input terminal, said first switch being a first rectifying element;

ii) a second switch provided between the second input terminal and the first power supply line, having an ON state and an OFF state controlled on a basis of a voltage at the first input terminal, said second switch being a second rectifying element;

iii) a first diode provided between the first input terminal and the second power supply line;

iv) a second diode provided between the second input terminal and the second power supply line; and said shunt includes a third switch to short said first and second input terminals bypassing said first and second diodes or said first and second switches when the detected charging voltage exceeds the predetermined voltage;

wherein said electronic equipment operates in accordance with electrical power that is supplied from said charging circuit.

17. A timepiece comprising:

a charging circuit for charging electrical power into a charging element, using a rectifying circuit having a plurality of rectifying elements, which converts an alternating current input from an alternating current power supply through first and second input terminals to a direct current and outputs the direct current, said charging circuit comprising:
  a charging voltage detector to detect a charging voltage of the charging element;
  a comparator to compare the detected charging voltage with a predetermined voltage; and
  a shunt to shunt said input terminals and bypass said plurality of rectifying elements when the detected charging voltage exceeds the predetermined voltage; and a timepiece circuit that measures time supplied with electrical power from said charging circuit; wherein said plurality of rectifying elements include:
  i) a first switch provided between the first input terminal and the first power supply line, having an ON state and an OFF state controlled on a basis of a voltage at the second input terminal, said first switch being a first rectifying element;
  ii) a second switch provided between the second input terminal and the first power supply line, having an ON state and an OFF state controlled on a basis of a voltage at the first input terminal, said second switch being a second rectifying element;
  iii) a first diode provided between the first input terminal and the second power supply line;
  iv) a second diode provided between the second input terminal and the second power supply line; and
  said shunt includes a third switch to short said first and second input terminals bypassing said first and second diodes or said first and second switches when the detected charging voltage exceeds the predetermined voltage.

18. An electronic equipment comprising:

a charging circuit for rectifying an alternating-current voltage supplied to first and second input terminals and for charging a charging element that is provided between first and second power supply lines, comprising:
  a first switch provided between the first input terminal and the first power supply line, having an ON state and an OFF state controlled on a basis of a voltage at the second input terminal;
  a second switch provided between the second input terminal and the first power supply line, having an ON state and an OFF state controlled on a basis of a voltage at the first input terminal;
  a first diode provided between the first input terminal and the second power supply line;
  a second diode provided between the second input terminal and the second power supply line;
  a comparator to detect a charging voltage of the charging element, and to compare the detected charging voltage with a predetermined voltage; and
  a shunt to shunt the first input terminal and the second input terminal by supplying a current that flows from one of the first and second input terminals to the other one of the first and second input terminals through a path that bypasses said first and second diodes and said first and second switches, based on a comparison result of said comparator;

wherein said electronic equipment operates in accordance with electrical power that is supplied from said charging circuit.

19. A timepiece comprising:

a charging circuit for rectifying an alternating-current voltage supplied to first and second input terminals and for charging a charging element that is provided between first and second power supply lines, comprising:
  a first switch provided between the first input terminal and the first power supply line, having an ON state and an OFF state controlled on a basis of a voltage at the second input terminal;
  a second switch provided between the second input terminal and the first power supply line, having an ON state and an OFF state controlled on a basis of a voltage at the first input terminal;
  a first diode provided between the first input terminal and the second power supply line;
  a second diode provided between the second input terminal and the second power supply line;
  a comparator to detect a charging voltage of the charging element, and to compare the detected charging voltage with a predetermined voltage; and
  a shunt to shunt the first input terminal and the second input terminal by supplying a current that flows from one of the first and second input terminals to the other one of the first and second input terminals through a path that bypasses said first and second diodes and said first and second switches, based on a comparison result of said comparator; and a timepiece circuit that measures time supplied with electrical power from said charging circuit.

20. An electronic equipment comprising:

a charging circuit for rectifying an alternating-current voltage supplied to first and second input terminals and for charging a charging element that is provided between a high-potential power supply line and a low-potential power supply line, comprising:
  a first diode in which an anode thereof is in electrical communication with the first input terminal, and a cathode thereof is in electrical communication with the high-potential power supply line;
  a second diode in which an anode thereof is in electrical communication with the second input terminal, and a cathode thereof is in electrical communication with the high-potential power supply line;
  a first N-channel field effect transistor in which a drain thereof is in electrical communication with the first input terminal, a source thereof is in electrical communication with the low-potential power supply line, and a gate thereof is in electrical communication with the second input terminal;
  a second N-channel field effect transistor in which a drain thereof is in electrical communication with the second input terminal, a source thereof is in electrical communication with the low-potential power supply line, and a gate thereof is in electrical communication with the first input terminal;
  a comparator to compare a charging voltage of the charging element with a predetermined voltage; and a transmission gate provided between the first and second input terminals having an ON state and an OFF state controlled on a basis of a comparison result of said comparator;

wherein said electronic equipment operates in accordance with electrical power that is supplied from said charging circuit.

21. A timepiece comprising:

a charging circuit for rectifying an alternating-current voltage supplied to first and second input terminals and for charging a charging element that is provided between a high-potential power supply line and a low-potential power supply line, comprising:

a first diode in which an anode thereof is in electrical communication with the first input terminal, and a cathode thereof is in electrical communication with the high-potential power supply line;

a second diode in which an anode thereof is in electrical communication with the second input terminal, and a cathode thereof is in electrical communication with the high-potential power supply line;

a first N-channel field effect transistor in which a drain thereof is in electrical communication with the first input terminal, a source thereof is in electrical communication with the low-potential power supply line, and a gate thereof is in electrical communication with the second input terminal;

a second N-channel field effect transistor in which a drain thereof is in electrical communication with the second input terminal, a source thereof is in electrical communication with the low-potential power supply line, and a gate thereof is in electrical communication with the first input terminal;

a comparator to compare a charging voltage of the charging element with a predetermined voltage; and a transmission gate provided between the first and second input terminals having an ON state and an OFF state controlled on a basis of a comparison result of said comparator; and a timepiece circuit that measures time supplied with electrical power from said charging circuit.

22. An electronic equipment comprising:

a charging circuit for rectifying an alternating-current voltage supplied to first and second input terminals and for charging a charging element that is provided between a high-potential power supply line and a low-potential power supply line, comprising:

a first diode in which a cathode thereof is in electrical communication with the first input terminal, and an anode thereof is in electrical communication with the low-potential power supply line;

a second diode in which a cathode thereof is in electrical communication with the second input terminal, and an anode thereof is in electrical communication with the low-potential power supply line;

a first P-channel field effect transistor in which a drain thereof is in electrical communication with the first input terminal, a source thereof is in electrical communication with the high-potential power supply line, and a gate thereof is in electrical communication with the second input terminal;

a second P-channel field effect transistor in which a drain thereof is in electrical communication with the second input terminal, a source thereof is in electrical communication with the high-potential power supply line, and a gate thereof is in electrical communication with the first input terminal;

a comparator to compare a charging voltage of said charging element with a predetermined voltage; and a transmission gate provided between the first and second input terminals having an ON state and an OFF state controlled on a basis of a comparison result of said comparator;

wherein said electronic equipment operates in accordance with electrical power that is supplied from said charging circuit.

23. A timepiece comprising:

a charging circuit for rectifying an alternating-current voltage supplied to first and second input terminals and for charging a charging element that is provided between a high-potential power supply line and a low-potential power supply line, comprising:

a first diode in which a cathode thereof is in electrical communication with the first input terminal, and an anode thereof is in electrical communication with the low-potential power supply line;

a second diode in which a cathode thereof is in electrical communication with the second input terminal, and an anode thereof is in electrical communication with the low-potential power supply line;

a first P-channel field effect transistor in which a drain thereof is in electrical communication with the first input terminal, a source thereof is in electrical communication with the high-potential power supply line, and a gate thereof is in electrical communication with the second input terminal;

a second P-channel field effect transistor in which a drain thereof is in electrical communication with the second input terminal, a source thereof is in electrical communication with the high-potential power supply line, and a gate thereof is in electrical communication with the first input terminal;

a comparator to compare a charging voltage of said charging element with a predetermined voltage; and a transmission gate provided between the first and second input terminals having an ON state and an OFF state controlled on a basis of a comparison result of said comparator; and a timepiece circuit that measures time supplied with electrical power from said charging circuit.

24. An electronic equipment comprising:

a charging circuit for rectifying an alternating-current voltage supplied to first and second input terminals and for charging a charging element that is provided between a high-potential power supply line and a low-potential power supply line, comprising:

a first diode in which a cathode thereof is in electrical communication with of the first input terminal, and an anode thereof is in electrical communication with of the low-potential power supply line;

a second diode in which a cathode thereof is in electrical communication with of the second input terminal, and an anode thereof is in electrical communication with of the low-potential power supply line;

a first P-channel field effect transistor in which a drain thereof is in electrical communication with of the first input terminal, a source thereof is in electrical communication with of the high-potential power supply line, and a gate thereof is in electrical communication with of the second input terminal;

a second P-channel field effect transistor in which a drain thereof is in electrical communication with of the second input terminal, a source thereof is in electrical communication with of the high-potential power supply line, and a gate thereof is in electrical communication with of the first input terminal;

a comparator to compare a charging voltage of said charging element with a predetermined voltage;

a third diode in which a cathode thereof is in electrical communication with of the first input terminal;

a fourth diode in which a cathode thereof is in electrical communication with of the second input terminal; and a third P-channel field effect transistor in which a drain thereof is in electrical communication with anodes of said third and fourth diodes, a source thereof is in electrical communication with of the high-potential power supply line, and a comparison result of said comparator is supplied to a gate thereof;

wherein said electronic equipment operates in accordance with electrical power that is supplied from said charging circuit.

25. A timepiece comprising:

a charging circuit for rectifying an alternating-current voltage supplied to first and second input terminals and for charging a charging element that is provided between a high-potential power supply line and a low-potential power supply line, comprising:

a first diode in which a cathode thereof is in electrical communication with of the first input terminal, and an anode thereof is in electrical communication with of the low-potential power supply line;

a second diode in which a cathode thereof is in electrical communication with of the second input terminal, and an anode thereof is in electrical communication with of the low-potential power supply line;

a first P-channel field effect transistor in which a drain thereof is in electrical communication with of the first input terminal, a source thereof is in electrical communication with of the high-potential power supply line, and a gate thereof is in electrical communication with of the second input terminal;

a second P-channel field effect transistor in which a drain thereof is in electrical communication with of the second input terminal, a source thereof is in electrical communication with of the high-potential power supply line, and a gate thereof is in electrical communication with of the first input terminal;

a comparator to compare a charging voltage of said charging element with a predetermined voltage;

a third diode in which a cathode thereof is in electrical communication with of the first input terminal;

a fourth diode in which a cathode thereof is in electrical communication with of the second input terminal; and a third P-channel field effect transistor in which a drain thereof is in electrical communication with anodes of said third and fourth diodes, a source thereof is in electrical communication with of the high-potential power supply line, and a comparison result of said comparator is supplied to a gate thereof; and a timepiece circuit that measures time supplied with electrical power from said charging circuit.

26. A charging circuit for rectifying an alternating-current voltage supplied to first and second input terminals and for charging a charging element that is provided between a first power supply line and a second power supply line, comprising:

a rectifying circuit including:

i) a first rectifying element coupled between said first input terminal and said first power supply line, said first rectifying element being a first switch responsive to said second input terminal;

ii) a second rectifying element coupled between said second input terminal and said first power supply line, said second rectifying element being a second switch responsive to said first input terminal;

iii) a third rectifying element coupled between said first input terminal and said second power supply line;

iv) a fourth rectifying element coupled between said second input terminal and said second power supply line;

a comparator to compare a charging voltage of said charging element with a predetermined voltage;

a shunting circuit including a third switch for selectively and alternately coupling said first power supply line to one of said first and second input terminals in response to said comparator, said shunting circuit alternating its shunting circuit configuration between a first configuration and a second configuration, said first configuration including said third and first switches and excluding said second switch, said second configuration including said third and second switch and excluding said first switch.

27. The charging circuit of claim 26 wherein said shunting circuit alternates between said first and second shunting circuit configurations in response to said input terminals when activated by said comparator.

28. The charging circuit of claim 26 wherein said shunting circuit further includes:

a first shorting diode coupled between said third switch and said first input terminal; and a second shorting diode coupled between said third switch and said second input terminal.

29. The charging circuit of claim 28 wherein said third switch is a field effect transistor having first electrode connected to said first power supply line, a gate electrode coupled to said comparator, a third electrode for coupling to one of said first and second input terminals, and a body electrode coupled to said first power rail such that an intrinsic diode is formed between said body electrode and said third electrode and no intrinsic diode is formed between said body electrode an said first power supply line;

said first shorting diode, second shorting diode, and intrinsic diode having a commonly selected one of their cathode and anode electrodes connected together, said first shorting electrode having its other electrode opposite said commonly selected electrode coupled to said first input terminal, said second shorting electrode having its other electrode opposite said commonly selected electrode coupled to said second input terminal.

30. The charging circuit of claim 28 wherein said first, second, and third switches are respective first, second, and third transistors.

31. The charging circuit of claim 30 wherein said third and fourth rectifying elements are respective first and second rectifying diodes.

32. The charging circuit of claim 31 wherein;

said first power supply line is a low-potential power supply line;

said second power supply line is a high-potential power supply line;

said first rectifying diode has an anode thereof in electrical communication with said first input terminal, and a cathode thereof in electrical communication with said high-potential power supply line;

said second rectifying diode has an anode thereof in electrical communication with said second input terminal, and a cathode thereof is in electrical communication with said high-potential power supply line;

said first transistor is a first N-channel field effect transistor in which a drain thereof is in electrical communication with said first input terminal, a source thereof is in electrical communication with said low-potential power supply line, and a gate thereof is its control input and is in electrical communication with said second input terminal;

said second transistor is a second N-channel field effect transistor in which a drain thereof is in electrical communication with said second input terminal, a source thereof is in electrical communication with said low-potential power supply line, and a gate thereof is its control input and is in electrical communication with said first input terminal; and said third transistor of said shunting circuit is a third N-channel field effect transistor in which a drain thereof said third electrode in electrical communication with the cathodes of said first and second shorting diodes, a source thereof is said first electrode in electrical communication with said low-potential power supply line, and a comparison result of said comparator is supplied to said gate electrode thereof.

33. The charging circuit of claim 31 wherein;

said first power supply line is a high-potential power supply line;

said second power supply line is a low-potential power supply line;

said first rectifying diode has a cathode thereof is in electrical communication with said first input terminal, and an anode thereof in electrical communication with said low-potential power supply line;

said second rectifying diode has a cathode thereof is in electrical communication with said second input terminal, and an anode thereof in electrical communication with said low-potential power supply line;

said first transistor is a first P-channel field effect transistor in which a drain thereof is in electrical communication with said first input terminal, a source thereof is in electrical communication with said high-potential power supply line, and a gate thereof is its control input and is in electrical communication with said second input terminal;

said second transistor is a second P-channel field effect transistor in which a drain thereof is in electrical communication with said second input terminal, a source thereof is in electrical communication with said high-potential power supply line, and a gate thereof is its control input and is in electrical communication with said first input terminal; and said third transistor of said shunting circuit is a third P-channel field effect transistor in which a drain thereof said third electrode in electrical communication with the anodes of said first and second shorting diodes, a source thereof is said first electrode in electrical communication with said high-potential power supply line, and a comparison result of said comparator is supplied to said gate electrode thereof.

34. An electronic equipment comprising:

a charging circuit as in claim 26, wherein said electronic equipment operates in accordance with electrical power that is supplied from said charging circuit.

35. A timepiece comprising:

a charging circuit as in claim 26; and a timepiece circuit that measures time supplied with electrical power from said charging circuit.

36. A charging circuit for rectifying an alternating-current voltage supplied to first and second input terminals and for charging a charging element that is provided between a first power supply line and a second power supply line, comprising:

a rectifying circuit including:
  i) a first and second rectifying element, said first rectifying element being coupled between said first input terminal and said first power supply line, said second rectifying element being coupled between said second input terminal and said first power supply line;
  ii) a third and fourth rectifying element, said third rectifying element being coupled between said first input terminal and said second power supply line, said fourth rectifying element being coupled between said second input terminal and said second power supply line;

a comparator for comparing a charging voltage of said charging element with a predetermined voltage;

a shunting circuit including a first bi-directional switch for selectively coupling said first input terminal to said second power supply line and a second bi-directional switch for selectable coupling said second input terminal to said second power supply line, said shunting circuit being responsive to said comparator and effective for selectively shunting said first input terminal to said second input terminal through said first and second bi-directional switches and bypassing all the rectifying elements of said rectifying circuit.

37. The charging circuit of claim 36 wherein, said first and second rectifying elements are respective first and second diodes; and said third and fourth rectifying elements are respective third and fourth bi-directional switches.

38. The charging circuit of claim 37 wherein, said first power supply is a high-potential power supply line;

said second power supply is a low-potential power supply line;

said first diode has an anode thereof is in electrical communication with said first input terminal, and has a cathode thereof in electrical communication with said high-potential power supply line;

said second diode has an anode thereof is in electrical communication with said second input terminal, and has a cathode thereof in electrical communication with said high-potential power supply line;

said third bi-directional switch is a first N-channel field effect transistor in which a drain thereof is in electrical communication with said first input terminal, a source thereof is in electrical communication with said low-potential power supply line, and a gate thereof is in electrical communication with said second input terminal;

said fourth bi-directional switch is a second N-channel field effect transistor in which a drain thereof is in electrical communication with said second input terminal, a source thereof is in electrical communication with the low-potential power supply line, and a gate thereof is in electrical communication with said first input terminal;

said first bi-directional switch is a third N-channel field effect transistor in which a drain thereof is in electrical communication with said first input terminal, a source thereof is in electrical communication with said low-potential power supply line, and a gate thereof is in electrical communication with an output terminal of said comparator; and said second bi-directional switch is a fourth N-channel field effect transistor in which a drain thereof is in electrical communication with the second input terminal, a source thereof is in electrical communication with said low-potential power supply line, and a gate thereof is in electrical communication with said output terminal of said comparator.

39. An electronic equipment comprising:

a charging circuit as in claim 36;

wherein said electronic equipment operates in accordance with electrical power that is supplied from said charging circuit.

40. A timepiece comprising:

a charging circuit as in claim 36; and a timepiece circuit that measures time supplied with electrical power from said charging circuit.

41. An overcharge prevention method which is used in a charging circuit, said charging circuit including a charging element and a rectifying circuit, said rectifying circuit including first and second switching elements being controlled in accordance with a terminal voltage at respective first and second input terminals to which an alternating-current voltage is supplied to selectively couple said input terminals to a first power supply line, said rectifying circuit being effective for rectifying said alternating-current voltage and for charging being effective for rectifying said alternating-current voltage and for charging electrical power into said charging element, said method comprising the steps of:

detecting a charging voltage of the charging element;

determining if the detected charging voltage exceeds a predetermined voltage; and providing a third switching element across said first and second input terminals to selectively shunt said input terminals.

42. A charging circuit for rectifying an alternating-current voltage supplied to first and second input terminals and for charging a charging element that is provided between first and second power supply lines, comprising:

a switch provided between the first input terminal and the first power supply line, having an ON state and an OFF state controlled on a basis of a voltage at the second input terminal;

a second switch provided between the second input terminal and the first power supply line, having an ON state and an OFF state controlled on a basis of a voltage at the second input terminal;

a second switch provided between the second input terminal and the first power supply line, having an ON state and an OFF state controlled on a basis of a voltage at the first input terminal;

a first diode provided between the first input terminal and the second power supply line;

a second diode provided between the second input terminal and the second power supply line;

a voltage detector to determine when a charging voltage of the charging element exceeds a predetermined votage; and a shunt including a third switch across said first and second input terminals to shunt the first input terminal and the second input terminal.

43. A charging circuit for rectifying an alternating-current voltage supplied to first and second input terminals and for charging a charging element that is provided between a high-potential power supply line and a low-potential power supply line, comprising:

a first diode in which an anode thereof is in electrical communication with the first input terminal, and a cathode thereof is in electrical communication with the high-potential power supply line;

a second diode in which an anode thereof is in electrical communication with the second input terminal, and a cathode thereof is in electrical communication with the high-potential power supply line;

a first N-channel field effect transistor in which a drain thereof is in electrical communication with the first input terminal, a source thereof is in electrical communication with the low-potential power supply line, and a gate thereof is in electrical communication with the second input terminal;

a second N-channel field effect transistor in which a drain thereof is in electrical communication with the second input terminal, a source thereof is in electrical communication with the low-potential power supply line, and a gate thereof is in electrical communication with the first input terminal;

a voltage detector to detect when a charging voltage of said charging element exceeds a predetermined voltage;

a third diode in which an anode thereof is in electrical communication with the first input terminal; and a fourth diode in which an anode thereof is in electrical communication with the second input terminal; and a third N-channel field effect transistor in which a drain thereof is in electrical communication with cathodes of said third and fourth diodes, a source thereof is in electrical communication with the low-potential power supply line, and a detection result of said voltage detector is supplied to a gate thereof.

44. A charging circuit form rectifying an alternating-current voltage supplied to first and second input terminals and for charging a charging element that is provided between a high-potential power supply line and a low-potential power supply line, comprising:

a first diode in which a cathode thereof is in electrical communication with the second input terminal, and an anode thereof is in electrical communication with the low-potential power supply line;

a second diode in which a cathode thereof is in electrical communication with the second input terminal, and an anode thereof is in electrical communication with the low-potential power supply line;

a first P-channel field effect transistor in which a drain thereof is in electrical communication with the first input terminal, a source thereof is in electrical communication with of the high-potential power supply line, and a gate thereof is in electrical communication with of the first input terminal;

a voltage detector to detect when a charging voltage of said charging element exceeds a predetermined voltage;

a third diode in which a cathode thereof is in electrical communication with the first input terminal;

a fourth diode in which a cathode thereof is in electrical communication with the second input terminal; and a third P-channel field transistor in which a drain thereof is in electrical communication with anodes of said third and fourth diodes, a source thereof is in electrical communication with the high-potential power supply line, and a detection result of said voltage detector is supplied to a gate thereof.

45. An electronic equipment comprising:

a charging circuit for rectifying an alternating-current voltage supplied to first and second input terminals and for charging a charging element that is provided between a high-potential power supply line and a low-potential power supply line, comprising:

a first diode in which a cathode thereof is in electrical communication with of the first input terminal, and an anode thereof is in electrical communication with of the low-potential power supply line;

a second diode in which a cathode thereof is in electrical communication with of the second input terminal, and an anode thereof is in electrical communication with of the low-potential power-supply line;

a first P-channel field effect transistor in which a drain thereof is in electrical communication with of the first input terminal, a source thereof is in electrical communication with of the high-potential power supply line, and a gate thereof is in electrical communication with of the second input terminal;

a second P-channel field effect transistor in which a drain thereof is in electrical communication with of the second input terminal, a source thereof is in electrical communication with of the high-potential power supply line, and a gate thereof is in electrical communication with of the first input terminal;

a voltage detector to detect when a charging voltage of said charging element exceeds a predetermined voltage;

a third diode in which a cathod thereof is in electrical communication with of the first input terminal;

a fourth diode in which a cathode thereof is in electrical communication with of the second input terminal; and a third P-channel field effect transistor in which a drain thereof is in electrical communication with anodes of said third and fourth doides, a source thereof is in electrical communication with of the high-potential power supply line, and a detection result of said voltage detector is supplied to a gate thereof;

wherein said electronic equipment operates in accordance with electrical power that is supplied from said charging circuit.

46. A timepiece comprising:

a charging circuit for rectifying an alternating-current voltage supplied to first and second input terminals and for charging a charging element that is provided between a high-potential power supply line and a low-potential power suppply line, comprising:

a first diode in which a cathode thereof is in electrical communication with of the first input terminal, and an anode thereof is in electrical communication with of the low-potential power suppply-line;

a second diode in which a cathode thereof is in electrical communication with ofn the second input terminal, and an anode thereof is in electrical communication with of the low-potential power supply line;

a first P-channel field effect transistor in which a drain thereof is in electrical communication with of the first input terminal, a source thereof is in electrical communication with of the high-potential power supply line, and a gate thereof is in electrical communicationn with of the second input terminal;

a second P-channel field effect transistor in which a drain thereof is in electrical communication with of the second input terminal, a source thereof is in electrical communication with of the high-potential power supply line, and a gate thereof is in electrical communication with of the first input terminal;

a voltage detector to detect when a charging voltage of said charging element exceeds a predetermined voltage;

a third diode in which a cathode thereof is in electrical communication with of the first input terminal;

a fourth diode in which a cathode thereof is in electrical communication with of the second input terminal; and a third P-channel field effect transistor in which a drain thereof is in electrical communication with anodes of said third and fourth diodes, a source thereof is in electrical communication with of the high-potential power supply line, and a detection result of said voltage detector is supplied to a gate thereof; and a timepeice circuit that measure time supplied with electrical power from said charging circuit.

* * * * *